United States Patent
Schydlowsky et al.

(10) Patent No.: US 12,019,691 B2
(45) Date of Patent: Jun. 25, 2024

(54) SYSTEM AND METHOD FOR REDUCING CRAWL FREQUENCY AND MEMORY USAGE FOR AN AUTONOMOUS INTERNET CRAWLER

(71) Applicant: Trackstreet, Inc., Las Vegas, NV (US)

(72) Inventors: Andrew Schydlowsky, Las Vegas, NV (US); Dennis Graham, Charlotte, NC (US); Jose Salvador Martin Moreno, Guadalajara (MX); Luis Ricardo Peña, Zapopan (MX); Mauricio Maldonado Chan, Zapopan (MX)

(73) Assignee: Trackstreet, Inc., Las Vegas, NV (US)

( * ) Notice: Subject to any disclaimer, the term of this patent is extended or adjusted under 35 U.S.C. 154(b) by 258 days.

(21) Appl. No.: 17/451,134

(22) Filed: Oct. 15, 2021

(65) Prior Publication Data
US 2022/0318321 A1    Oct. 6, 2022

Related U.S. Application Data

(60) Provisional application No. 63/200,918, filed on Apr. 2, 2021.

(51) Int. Cl.
*G06F 16/951* (2019.01)
(52) U.S. Cl.
CPC .................................. *G06F 16/951* (2019.01)
(58) Field of Classification Search
None
See application file for complete search history.

(56) References Cited

U.S. PATENT DOCUMENTS

| 7,143,088 B2 | 11/2006 | Green et al. |
| 7,310,632 B2 | 12/2007 | Meek et al. |

(Continued)

FOREIGN PATENT DOCUMENTS

| WO | 2018157686 | 9/2018 |
| WO | 2019180489 | 9/2019 |

OTHER PUBLICATIONS

Kim, et al. "Design and implementation of web crawler based on dynamic web collection cycle" The International Conference on Information Network 2012. IEEE, 2012.
(Continued)

*Primary Examiner* — Tarek Chbouki
*Assistant Examiner* — Loan T Nguyen
(74) *Attorney, Agent, or Firm* — Schultz & Associates, P.C.

(57) ABSTRACT

The system which dynamically determines crawl frequency. Crawl frequency is computed by determining the proportional integral derivative (PID) contribution of certain data to the system. Alternatively, the system determines the next time to crawl based on both the rate of change and displacement of data. Maximum and minimum wait times between crawls are taken into account for the computation. In another embodiment, crawl frequency is calculated based on the rate of change. The system determines the next time to crawl based on the rate of change of data within set parameters, such as maximum and minimum wait times between crawls. Alternatively, the system implements a recurrent neural network (RNN) using long short-term memory (LSTM) units for a future data prediction. With this information, the system determines the next time to crawl.

6 Claims, 41 Drawing Sheets

(56) References Cited

U.S. PATENT DOCUMENTS

| | | |
|---|---|---|
| 7,328,401 B2 | 2/2008 | Obata et al. |
| 7,398,271 B1 | 7/2008 | Borkovsky et al. |
| 7,454,410 B2 | 11/2008 | Squillante et al. |
| 7,774,782 B1 | 8/2010 | Popescu et al. |
| 8,032,518 B2 | 10/2011 | Fox et al. |
| 8,255,385 B1 | 8/2012 | Sun et al. |
| 8,386,459 B1 | 2/2013 | Auerbach et al. |
| 8,712,992 B2 | 4/2014 | Maykov et al. |
| 8,775,403 B2 | 7/2014 | Randall |
| 8,782,031 B2 | 7/2014 | Wierman et al. |
| 8,838,571 B2 | 9/2014 | Erera et al. |
| 8,868,541 B2 | 10/2014 | Lin et al. |
| 9,002,819 B2 | 4/2015 | Brawer et al. |
| 9,355,177 B2 | 5/2016 | Brawer et al. |
| 9,652,538 B2 | 5/2017 | Shivaswamy et al. |
| 11,256,845 B2 * | 2/2022 | Nath ................ G06N 20/20 |
| 11,663,779 B2 * | 5/2023 | Shayani ............ G06T 17/205 |
| | | 345/419 |
| 2004/0225644 A1 | 11/2004 | Squillante et al. |
| 2010/0205168 A1 | 11/2010 | Yang et al. |
| 2022/0036302 A1 * | 2/2022 | Cella ............... G06Q 10/0834 |
| 2022/0101438 A1 * | 3/2022 | Gao ................. G06Q 30/0201 |
| 2022/0197306 A1 * | 6/2022 | Cella ............... G06Q 10/087 |
| 2022/0245574 A1 * | 8/2022 | Cella ............... G06Q 10/087 |

OTHER PUBLICATIONS

Olston, et al. "Recrawl scheduling based on information longevity" Proceedings of the 17th international conference on World Wide Web. 2008.

Coffman, et al. "Optimal robot scheduling for web search engines" Journal of scheduling 1.1 (1998): 15-29.

Cho, et al. "Estimating frequency of change" ACM Transactions on Internet Technology (TOIT) 3.3 (2003): 256-290.

\* cited by examiner

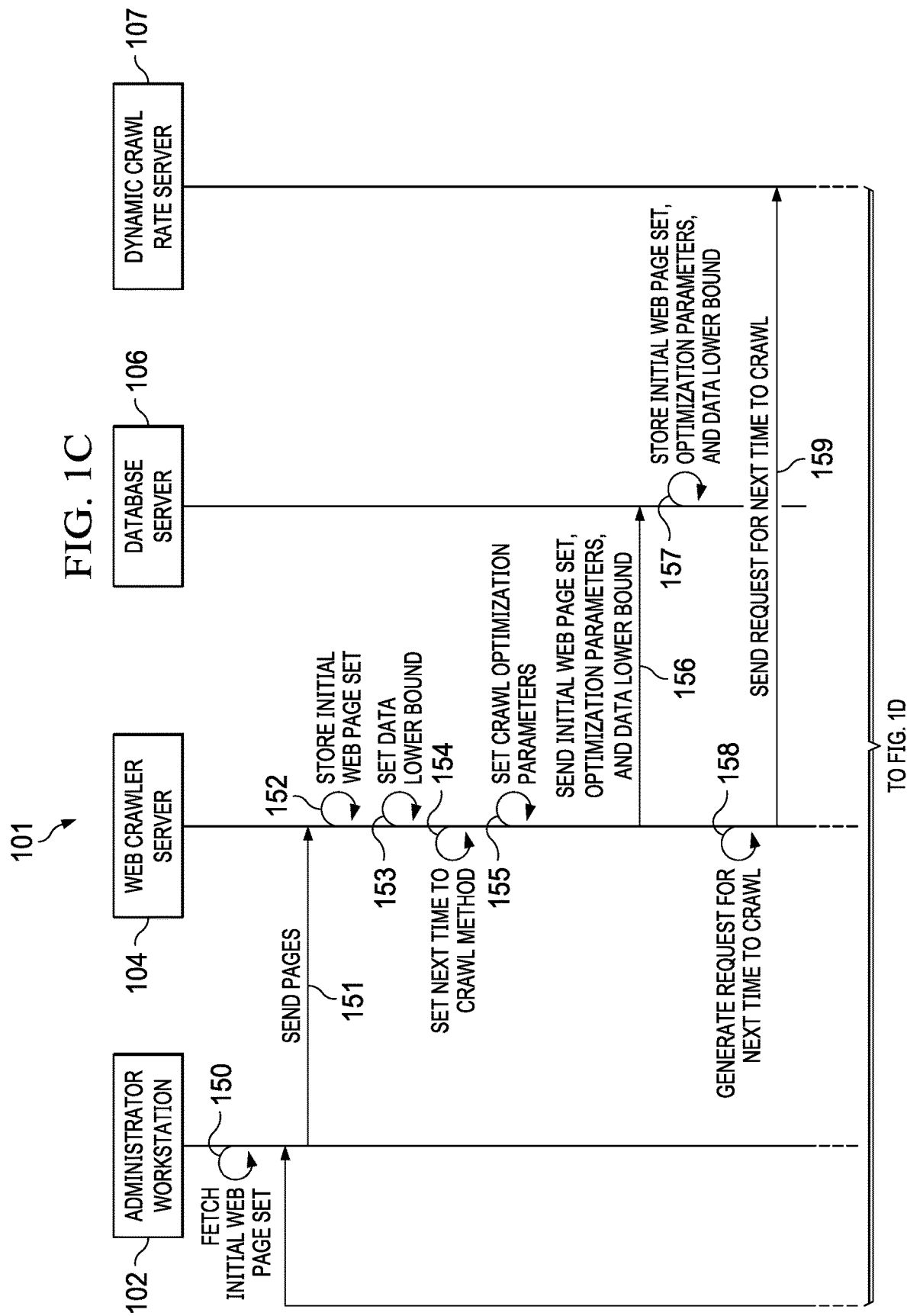

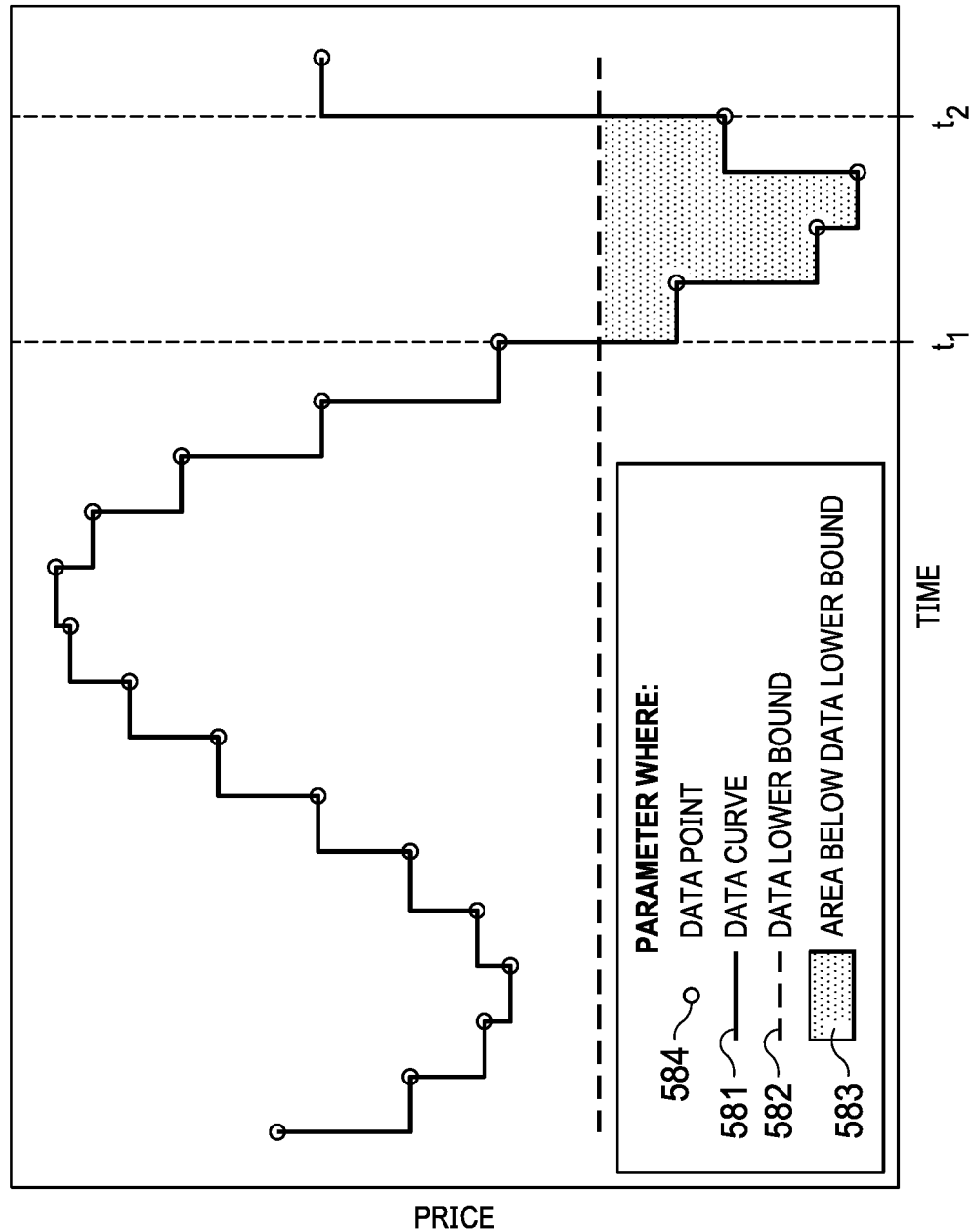

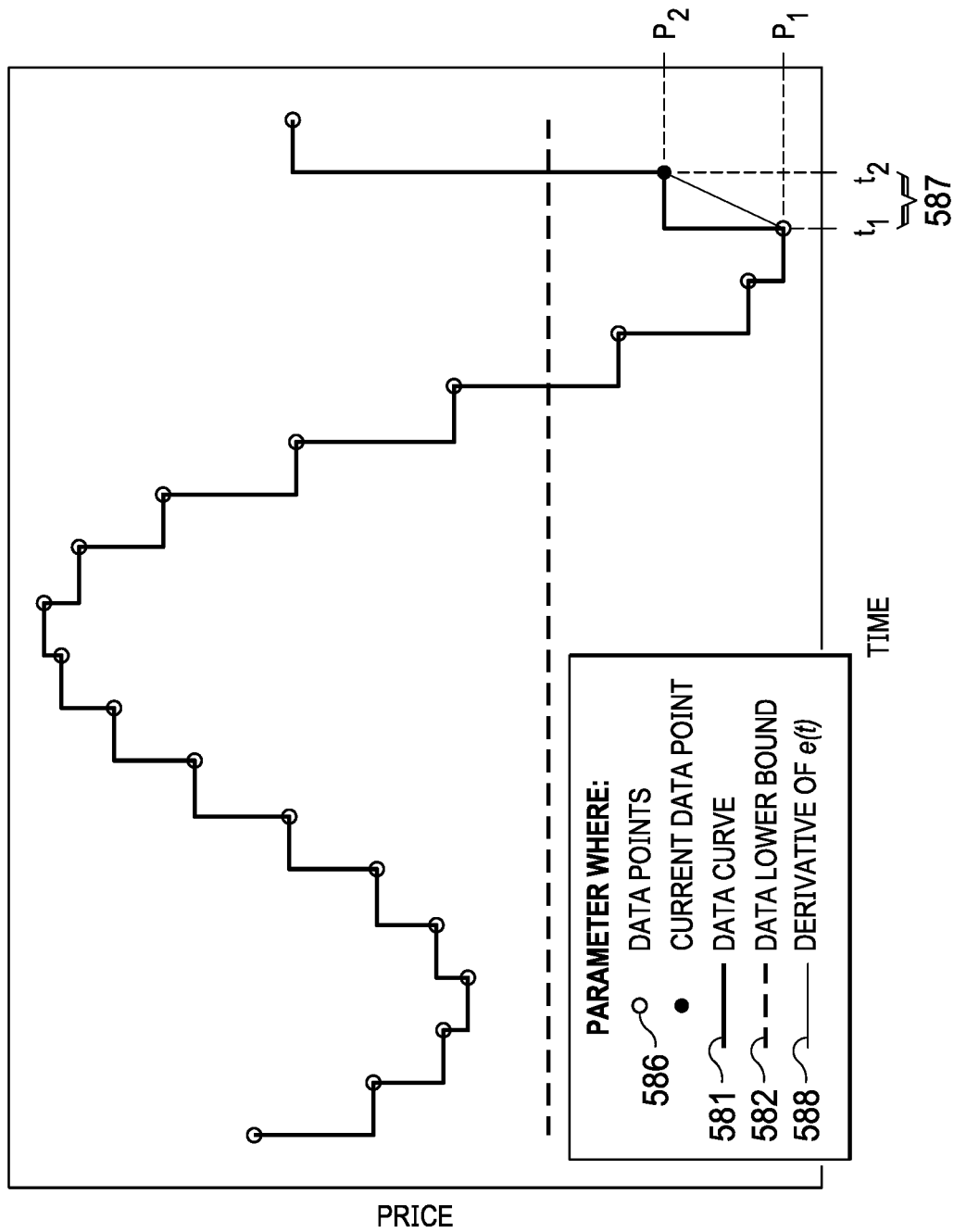

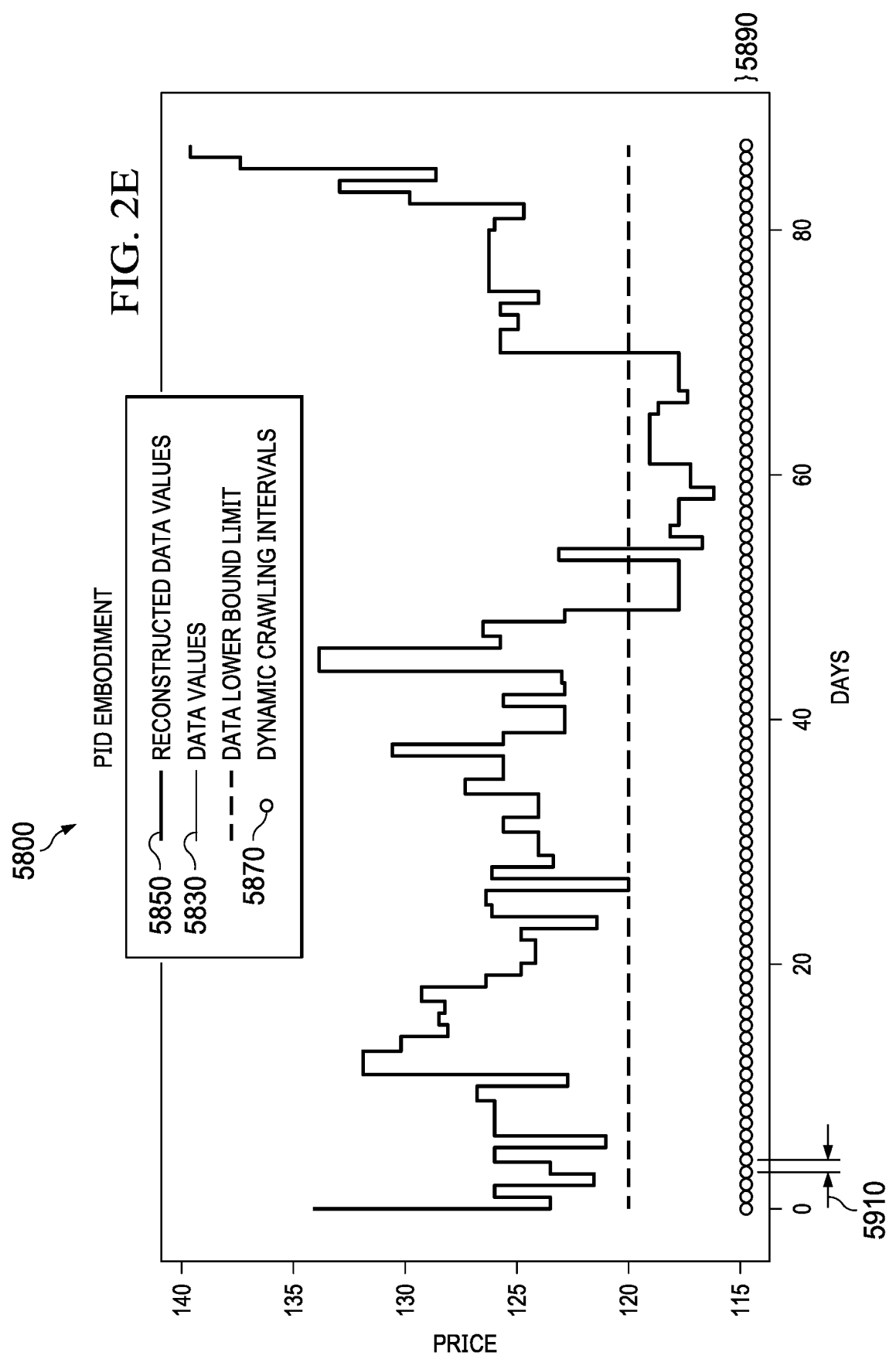

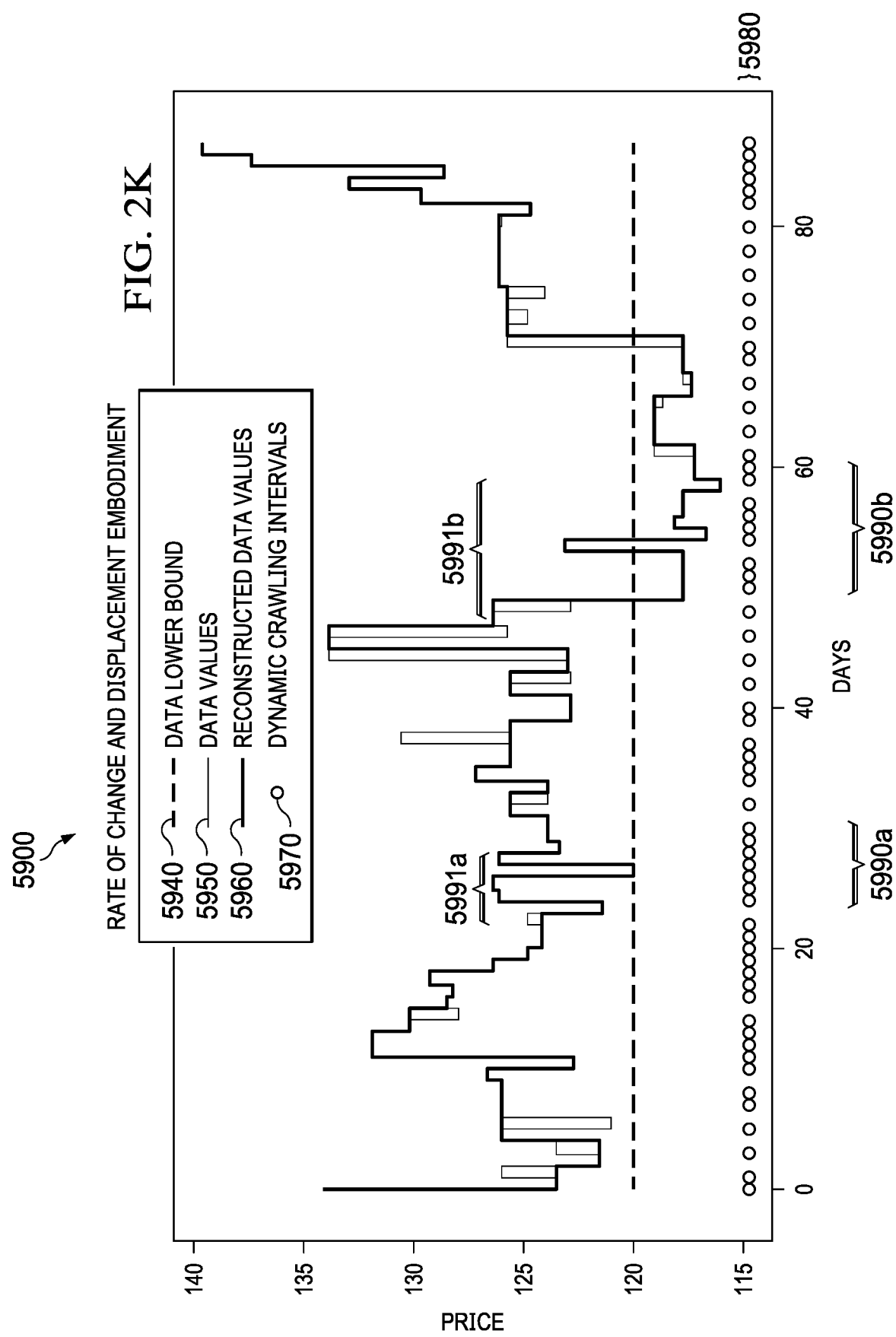

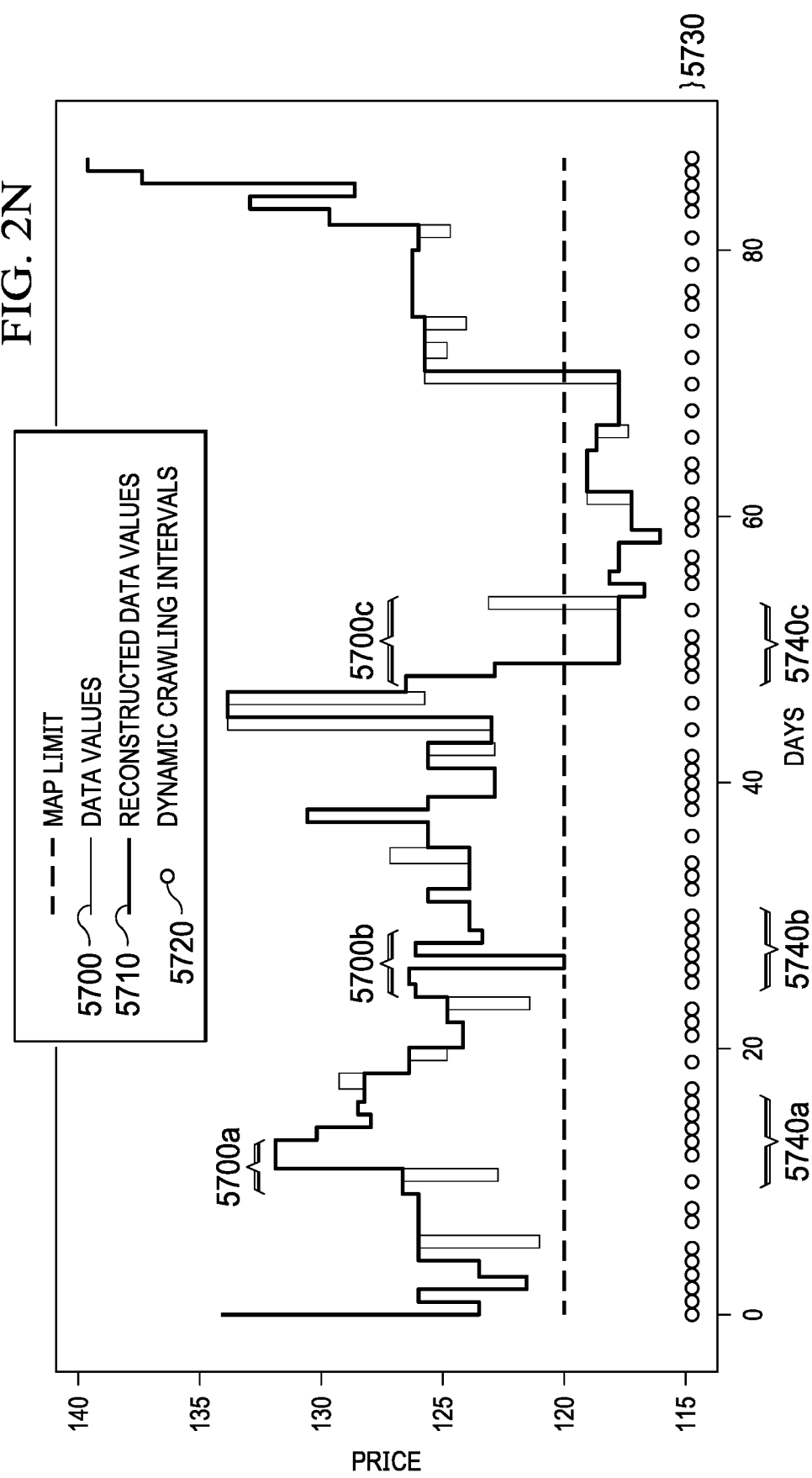

```
1   # Import libraries to be used
2   import os
3   import datetime
4   import numpy as np
5   import pandas as pd
6   import tensorflow as tf
7   import database as database
8   import matplotlib.pyplot as plt
9   import seaborn as sb
10  from numpy import newaxis
11  from scipy.stats import norm
12  from keras.layers.advanced_activations import LeakyReLU
13  from sklearn.preprocessing import MinMaxScaler
14  from sklearn.metrics import mean_squared_error
15
16  class DataLoader():
17          """A class for loading and transforming data for the lstm
18  model"""
19          def __init__(self, filename, product_id, window_size,
20  train_days, test_days):
21                  # Read a comma-separated values (csv) file into a
22                  #DataFrame
23                  df = pd.read_csv(filename)
24                  # Instantiate a minxmaxscaler. It transforms features by
25                  #scaling each feature to a given range.
26                  self.minmaxscaler = MinMaxScaler(feature_range=(0, 1))
27                  # For some products, there might be a gap of information
28                  #for some days because it doesn't exist in the database.
29                  self.prepare_lstm_data(df)
30                  # Set up the "self" variables with the information
31                  #passed to class
32                  self.product_id = product_id
33                  self.window_size = window_size
34                  self.train_days = train_days
35                  self.test_days = test_days
36
37
38          def prepare_lstm_data(self, df):
39                  """
40                  Fill gaps in info with previous row info.
41                  :param df: receives df (dataframe) with all the
42                  information
43                  :return:
44                  """
45                  # Suppose variable "df" doesnt have information for day
46                  #2020-02-19. Then, this function will take the
```

FIG. 7A

```
47  #information from the previous day 2020-02-18 and copy
48  #it to the 2020-02-19 row.
49  # Initialize lists that will be used.
50  min_price_list = []
51  map_price_list = []
52  dates_list = []
53  # Iterate for each row.
54  for index, row in df.iterrows():
55      min_price = row['min_price']
56      cur_date = row['date_consult']
57      cur_map = row['map']
58      # Append current date to dates_list
59      dates_list.append(cur_date)
60      # Evaluate if min_price is a number
61      if np.isnan(min_price):
62          # If it is the first row in the list, there is
63          # no info from previous day, and it returns
64          if len(min_price_list) == 0:
65              self.normalized_min_price = None
66              return
67          # Append the last row [-1] from min_price_list
68          #(repeats the last row min_price_list)
69          # Append the last row [-1] from map_price_list
70          #(repeats the last row in map_price_list)
71          min_price_list.append(min_price_list[-1])
72          map_price_list.append(map_price_list[-1])
73      else:
74          # If min_price is a number, append it to the
75          #list
76          min_price_list.append(min_price)
77          map_price_list.append(cur_map)
78
79  # Transform min_price_list to array
80  min_price_array = np.array(min_price_list)[:, newaxis]
81  # Set up the "self" variables with the information
82  #calculated
83  self.unnormalized_min_price = min_price_array
84  # Normalize the minprice information to fall between 0
85  #and 1
86  min_price_list = self.min_max_normalize(min_price_array)
87  # Set up the "self" variables with the information
88  #calculated
89  self.normalized_min_price = min_price_list
90  self.map_price_list = map_price_list
91  self.dates_list = dates_list
92
```

FIG. 7B

```
93      def min_max_normalize(self, unnormalized_array: np.array) ->
94  np.ndarray:
95          """
96          This function instantiates the minmaxscaler and
97          transforms the array that is passed, so all its values
98          fall in the 0-1 range. LSTMs are sensitive to the scale
99          of the input data. Different time periods of data may
100         have different value ranges.
101         :param unnormalized_array: Receives as input an
102         unnormalized array.
103         :return: Returns the array normalized using minmaxscaler
104         """
105         normalized_array =
106  (self.minmaxscaler.fit_transform(unnormalized_array)).astype('fl
107  oat64')
108         return normalized_array
109
110     def min_max_unnormalize(self, normalized_array: np.array) ->
111  np.ndarray:
112         """
113         This functions instantiates the minmaxscaler and
114         transforms back a previously transformed normalized
115         array
116         :param normalized_array: Receives as input a normalized
117         array
118         :return: Returns the array unnormalized using
119         minmaxscaler
120         """
121         unnormalized_array =
122  self.minmaxscaler.inverse_transform(normalized_array)
123         return unnormalized_array
124
125     def generate_train_test_windows(self, current_window):
126         """
127         This function generates the corresponding info for the
128         current window. The number of windows is correspondent
129         to the number of test_days
130         :param current_window: number of the window to be
131         processed
132         :return:
133         """
134         # Generate the info for all windows. For 90 days
135         #all_windows will have the input and output for 88
136         all_windows =
137  self.generate_windows(self.normalized_min_price)
138         # Get the input and output training data for 28 days (30
139         #training days - window size of 2)
```

FIG. 7C

```
140            self.train_X, self.train_Y =
141 all_windows[0][current_window:self.train_days-
142 self.window_size+current_window],
143 all_windows[1][current_window:self.train_days-
144 self.window_size+current_window]
145            # Get the input and output data that will be tested in
146            #the trained network (1 day)
147            self.test_X, self.test_Y =
148 all_windows[0][self.train_days-
149 self.window_size+current_window][newaxis],
150 all_windows[1][self.train_days-
151 self.window_size+current_window][newaxis]
152            # Get the info for the current window: last price, last
153            #date, next date and current map.
154            self.last_price =
155 self.unnormalized_min_price[self.train_days-1+current_window]
156            self.last_date =
157 datetime.datetime.strptime(self.dates_list[self.train_days-
158 1+current_window], "%Y-%m-%d")
159            self.next_date =
160 datetime.datetime.strptime(self.dates_list[self.train_days-
161 1+current_window], "%Y-%m-%d")+datetime.timedelta(days=1)
162            self.cur_map = self.map_price_list[self.train_days-
163 1+current_window]
164
165        def generate_windows(self, unprocessed_array):
166            """
167            This function will create the input, output arrays from
168            the information in unprocessed_array
169            Window_size is the size of the window to be considered,
170            in this case is 2
171            The unprocessed_array has the min_price information of
172            the last 90 days. This function will set up as needed
173            for the LSTM
174            For example if unprocessed_array is a list
175            [0,1,2,3,4,5,6,7,8,9] and window_size is 2. Then this
176            function will return
177            input, output =
178            [0, 1], [2]
179            [1, 2], [3]
180            [2, 3], [4]
181            [3, 4], [5]
182            [4, 5], [6]
183            [5, 6], [7]
184            [6, 7], [8]
185            [7, 8], [9]
186            Note that input and output are of length 8.
```

FIG. 7D

```
187         :param unprocessed_array: Array with the min_price info
188         for the last 90
189         :return: Two arrays input, and output. For an array of
190         90 days and a window_size of 2, both input and output
191         will be of size 88
192         """
193         # Retrieve the window size defined
194         window_size = self.window_size
195         # Initialize input and output arrays
196         input_array = []
197         output_array = []
198         # Iterate for all the possible windows
199         for i in range((len(unprocessed_array) // window_size) *
200     window_size - window_size):
201             # Retrieve the input information
202             x = np.array(unprocessed_array[i: i + window_size])
203             # Retrieve the corresponding output information
204             y = np.array(unprocessed_array[i + window_size])
205             # Append x and y to the input_array and output_array
206             #correspondingly
207             input_array.append(x)
208             output_array.append(y)
209         return np.array(input_array), np.array(output_array)
210 class LSTMDynamicCrawlingProposal():
211     """A class for building and inferencing an lstm model"""
212     def __init__(self):
213         # Setup the dynamic crawling parameters
214         self.c_max = 86400 * 2 # max time 1 day (in secs)
215         self.c_min = 7200 # min time 2 hrs (in secs)
216         self.alpha = 0.1
217         self.threshold_risk = 0.1
218         # Create a keras LSTM model with the Sequential()
219         #constructor.
220         self.model = tf.keras.Sequential()
221     def build_model(self, window_size=10, number_of_features=1):
222         """
223         This function builds the LSTM model to be used. It uses
224         three stacked hidden layers.
225         Multiple hidden LSTM layers can be stacked one on top of
226         another in what is referred to as a Stacked LSTM model.
227         https://keras.io/api/layers/recurrent_layers/lstm/
228         :param window_size: number of days to considered, the
229         LSTM uses a sliding window of 10 days
230         :param number_of_features: we are only using one
231         feature: min_price
232         :return:
233         """
```

FIG. 7E

```
234         # Define the first LSTM layer with 20 hidden units. The
235         #input shape is 10x1
236         # Argument return_sequences = True ensures that the LSTM
237         #cell returns all of the outputs from the
238         # unrolled LSTM cell through time. If this argument is
239         #left out, the LSTM cell will simply
240         # provide the output of the LSTM cell from the last time
241         #step.
242         self.model.add(tf.keras.layers.LSTM(20,
243 input_shape=(window_size, number_of_features),
244 return_sequences=True))
245         # Define the second LSTM layer with 20 hidden units.
246         self.model.add(tf.keras.layers.LSTM(20))
247         # Define the output layer. We define it to use a
248         #LeakyReLu activation function
249         self.model.add(tf.keras.layers.Dense(number_of_features,
250 activation=LeakyReLU(alpha=0.3)))
251         # Once the model is defined we need to compile it. We
252         #define it to use an "adam" optimizer
253         https://arxiv.org/abs/1412.6980
254         # and loss function mean squared error.
255         self.model.compile(optimizer="adam",
256 loss="mean_squared_error")
257         print("Model compiled")
258
259     def train_model(self, x, y, epochs, batch_size):
260         """
261         This function trains the LSTM model for a fixed number
262         of epochs (iterations on a dataset).
263         :param x: Input data
264         :param y: output data
265         :param epochs: Number of epochs to train the model. An
266         epoch is an iteration over the entire `x` and `y` data
267         provided.
268         :param batch_size: Number of samples per gradient
269         update.
270         :return:
271         """
272         callbacks = []
273         self.model.fit(
274             x,
275             y,
276             epochs=epochs,
277             batch_size=batch_size,
278             callbacks=callbacks
279         )
280
```

FIG. 7F

```
281     def get_predictions(self, feature_array: np.array) ->
282 np.ndarray:
283         """
284         This function generates output predictions for the input
285         samples.
286         :param feature_array:
287         :return:
288         """
289         predictions_array = self.model.predict(feature_array)
290         return predictions_array
291
292     def compute_next_time_to_crawl(self, data):
293         """
294         This function computes the next time to crawl according
295         to the proposal diagram
296
297         :param data:
298         :return:
299         """
300         if (min(data["predicted_prices"]) < data["product_map"])
301 or (min(data["predicted_prices"]) <= \
302                     0.75 * min(data["last_prices"])) or (1.25 *
303 min(data["last_prices"]) <= min(data["predicted_prices"])):
304                 return self.c_min
305         else:
306                 return self.c_max
307
308
309 def calculate_mse(true_array, predict_array):
310     """
311     This method calculates the mean squared error between the
312     correct info array and its corresponding
313     prediction generated by the LSTM model. It measures the
314     average of the squares of the errors.
315     :param true_array:
316     :param predict_array:
317     :return:
318     """
319     score = mean_squared_error(true_array, predict_array)
320     return score
321
322 def plot_results_by_product(data, predictions_list,
323 targets_list, next_crawl_list):
324     """
325     This function creates the plot to display the predictions
326     and training data.
327     :param data: Product data
```

FIG. 7G

```
328         :param predictions_list: List with the prediction values
329         from the LSTM model
330         :param targets_list: List with the real values
331         :param next_crawl_list: List with the values for next crawl
332         :return:
333         """
334         fig, ((ax1, ax3)) = plt.subplots(nrows=2,
335 ncols=1,figsize=(10,10), gridspec_kw={'height_ratios': [3, 1]})
336         fig.subplots_adjust(hspace=0.4, wspace=0.4)
337         product_id = data.product_id
338         window_size = data.window_size
339         dates_list = list(range(len(data.dates_list)))
340
341 ax1.plot(dates_list[window_size:window_size+len(data.train_Y)+le
342 n(data.test_Y)],
343 data.unnormalized_min_price[window_size:window_size+len(data.tra
344 in_Y)+len(data.test_Y)], 'b-', label="Train min prices")
345
346 ax1.plot(dates_list[window_size+len(data.train_Y):window_size+le
347 n(data.train_Y)+len(targets_list)], targets_list, 'g-',
348 label="Test min prices")
349
350 ax1.plot(dates_list[window_size+len(data.train_Y):window_size+le
351 n(data.train_Y)+len(targets_list)], predictions_list, 'r-',
352 label="Predictions min")
353         ax1.plot(dates_list[:40], data.map_price_list[:40], 'k--',
354 label="Product MAP")
355         ax1.title.set_text("Product:{0} Window Size:{1}
356 ".format(product_id, window_size))
357         ax1.legend()
358         xticks = list(range(30, 40))
359         sb.heatmap(np.array(next_crawl_list)[newaxis], vmin=0.0,
360 vmax=48.0, fmt='.1f', annot=True, xticklabels=xticks,
361 yticklabels=False, linewidths=.5,
362             ax=ax3, cbar_kws={"orientation": "horizontal"})
363         ax3.title.set_text("Next time to crawl (in hrs)")
364         savename = "LSTMimages/Product:{0}-
365 WindowSize:{1}_results_min.svg".format(product_id, window_size)
366         plt.savefig(savename, quality=100)
367         plt.clf()
368         plt.close(fig)
369         del fig, ax1, ax3
370
371
372     def get_rows_from_ptn(product_id, number_of_days):
373         """
374         This function retrieves the min prices for each date in the
```

FIG. 7H

```
375        last number_of_days for product_id and saves it in a CSV
376        file
377        :param product_id:
378        :param number_of_days:
379        :return:
380        """
381        # Query below retrieves fields id, clid, date of consult,
382        #date, ar (amazon), map, product id, merchant id, min_price,
383        #average price, violation count and id count for the last
384        #number_of_days
385        query = """
386                    SELECT
387                        id, clid, date_consult, dt, ar, map, pid,
388   mid, min_price, avg_price, violation_count, id_count
389                FROM (SELECT
390                            DATE_ADD(CURRENT_DATE(), INTERVAL -
391   @rownum:=@rownum + 1 DAY) AS date_consult
392                    FROM
393                        (SELECT @rownum:=0) as aux, amazon_ASIN
394                    LIMIT {1}) dc
395                LEFT JOIN
396                    (SELECT
397                        id, clid, from_unixtime(dt, '%Y-%m-%d')
398   as crawl_date, dt, ar, ap as map, min(mpo) as min_price,
399   avg(mpo) as avg_price, pid , mid,
400                        SUM(CASE WHEN mpo < ap THEN 1 ELSE 0
401   END) as violation_count, COUNT(id) as id_count
402                    FROM
403                        products_trends_new
404                    WHERE
405                        pid = 0
406                        AND ar = 'amazon'
407                        AND dt >= unix_timestamp(CURRENT_DATE()
408   - INTERVAL {1} DAY)
409                    GROUP BY crawl_date
410                    ORDER BY dt ASC) ptn
411                ON DATE(ptn.crawl_date) = dc.date_consult
412            ORDER BY dc.date_consult
413        """
414        # Retrieve the min prices from PTN table
415        results =
416   database.execute_select_all(query.format(product_id,
417   number_of_days), dictionary=True)
418        # Create the pandas dataframe from the results returned
419        df = pd.DataFrame().from_dict(results)
420        # Format column date_consult Y-m-d
421        df["date_consult"] = df["date_consult"].apply(
```

FIG. 7I

```
422            lambda x: datetime.datetime.strptime(x, "%Y-%m-
423 %d").date() if isinstance(x, str) else x)
424            # If there is information retrieved then create the
425            #corresponding CSV file
426            if len(df) > 0:
427                filename =
428 "LSTMdatasets/ptn_data_product_{0}".format(product_id)
429                df.to_csv("{}.csv".format(filename), index=False)
430
431 def get_data():
432     """
433     This function iteratively creates the CSV files for the
434     products defined in products_ids
435     :return:
436     """
437     # Setup the store id, number of days and product ids to be
438     #processed.
439     store_id = 1320
440     number_of_days = 90
441     product_ids = [118954, 118955, 118958, 118959, 118960,
442 118961, 118962, 118963, 118964]
443     # For each product create the CSV file
444     for product_id in product_ids:
445         get_rows_from_ptn(product_id, number_of_days)
446
447
448 def run_tests():
449     # Setup the parameters for training the LSTM neural network
450     # Number of epochs that the LSTM neural network will train
451     epochs = 30
452
453     # Number of batches used on each epoch
454     batch_size = 16
455
456     # Number of forward days for prediction. Network will
457     #predict the following 10 days
458     test_days = 10
459     # Number of previous days use to train the LSTM network
460     #(Long Term memory)
461     train_days = 30
462     # Number of the last days used (Short Term memory)
463     window_size = 2
464
465     # Since the queries to the PTN table were very expensive, we
466     #cached the queries response in csv files for each product.
467     # The files for each product were stored in folder
468     #"LSTMdatasets", the following line of code retrieves all
```

FIG. 7J

```
469        #the files in that folder in variable "f" and iterates over
470        #that variable.
471        for r, d, f in os.walk("LSTMdatasets/"):
472            for file in f:
473                # Variable "file" contains the file name in process,
474                #for example "ptn_data_product_118964.csv"
475                # The following line of code retrieves the
476                #product_id (118964) from the "file" variable.
477                # The CSV file has the information for the last 90
478                #days
479                product_id = file.replace("ptn_data_product_",
480 "").replace(".csv", "")
481                print("*" * 20 + "Processing product
482 {0}".format(product_id))
483
484                # Initialize lists that will hold the information
485                predictions_list = []
486                targets_list = []
487                next_crawl_list = []
488                score_list = []
489                # file_name is the join of the directory and file,
490                #for example
491                #"LSTMdatasets/ptn_data_product_118964.csv"
492                file_name = os.path.join(r, file)
493                # Instantiate and initialize the data loader class
494                ptn_data = DataLoader(
495                    file_name,
496                    product_id,
497                    window_size,
498                    train_days,
499                    test_days
500                )
501                # Validate that the ptn_data did not have a first
502                #row with no info
503                if ptn_data.normalized_min_price is not None:
504                    # Iterate over each of the test days defined.
505                    #There will be 10 predictions
506                    for i in range(test_days):
507                        # Instantiate the
508                        #LSTMDynamicCrawlingProposal class
509                        lstmModel = LSTMDynamicCrawlingProposal()
510
511                        # build the LSTM model
512                        lstmModel.build_model(window_size)
513
514                        # Layout the data as need for the LSTM
515                        #network and setup the data for the current
```

FIG. 7K

```
516                #window
517                ptn_data.generate_train_test_windows(i)
518
519                # Train the LSTM model with the training
520                #data
521                lstmModel.train_model(ptn_data.train_X,
522   ptn_data.train_Y, epochs, batch_size)
523
524                # Get train output predictions (28
525                #predictions)
526                train_predictions =
527   lstmModel.get_predictions(ptn_data.train_X)
528                # Get test output predictions (1 prediction)
529                test_predictions =
530   lstmModel.get_predictions(ptn_data.test_X)
531
532                # Unnormalize the train predictions to get
533                #its corresponding price
534                train_predictions_prices =
535   ptn_data.min_max_unnormalize(train_predictions)
536                # Unnormalize the training output to get its
537                #corresponding price
538                train_y_prices =
539   ptn_data.min_max_unnormalize(ptn_data.train_Y)
540
541                # Unnormalize the test prediction to get its
542                #corresponding price
543                test_predictions_prices =
544   ptn_data.min_max_unnormalize(test_predictions)
545                # Unnormalize the testing output to get its
546                #corresponding price
547                test_y_prices =
548   ptn_data.min_max_unnormalize(ptn_data.test_Y)
549
550                # Calculate the mean square error between
551                #the (28) training prices and the
552                #corresponding (28) predictions
553                # calculated by the LSTM model
554                train_score = calculate_mse(train_y_prices,
555   train_predictions_prices)
556                # Print the training score
557                print('Train Score: %.4f MSE' %
558   (train_score))
559
560                # Calculate the mean square error between
561                #the (1) testing price and its corresponding
562                #(1) prediction calculated by the LSTM
```

FIG. 7L

```
563                 #model.
564                 test_score = calculate_mse(test_y_prices,
565 test_predictions_prices)
566                 # Print the testing score
567                 print('Test Score: %.4f MSE. Data mean %.4f'
568 % (test_score, test_predictions_prices.mean()))
569
570                 # Append current prediction to the
571                 #predictions list for plotting
572                 predictions_list.append(float(test_predictions_pr
573 ices))
574                 # Append current correct price to the
575                 #targets list for plotting
576                 targets_list.append(float(test_y_prices))
577                 # Append current train score to the score
578                 #list for plotting
579                 score_list.append(train_score)
580
581                 # Create dictionary to be passed to the
582                 #compute_next_time_to_crawl function
583                 crawl_data = {
584                     "product_map": ptn_data.cur_map,
585                     "last_prices": ptn_data.last_price,
586                     "time_last_crawl": ptn_data.last_date,
587                     "time_prediction": ptn_data.next_date,
588                     "predicted_prices":
589 test_predictions_prices,
590                 }
591
592                 # Compute the next time to crawl according
593                 #to the proposal
594                 next_time_to_crawl =
595 lstmModel.compute_next_time_to_crawl(crawl_data)
596                 # c_min and c_max are setup in secs, we
597                 #divide them by 3600 to convert them to
598                 #hours.
599                 next_crawl_list.append(next_time_to_crawl/36
600 00)
601
602                 # Plotting functions
603                 plot_results_by_product(ptn_data,
604 predictions_list, targets_list, next_crawl_list)
605                 print("Stop")
606             else:
607                 print("Incorrect data")
608
609 if __name__ == '__main__':
```

FIG. 7M

610 #Create the csv files
611 get_data()
612 #Start running the test for the csv files created
613 run_tests()

FIG. 7N

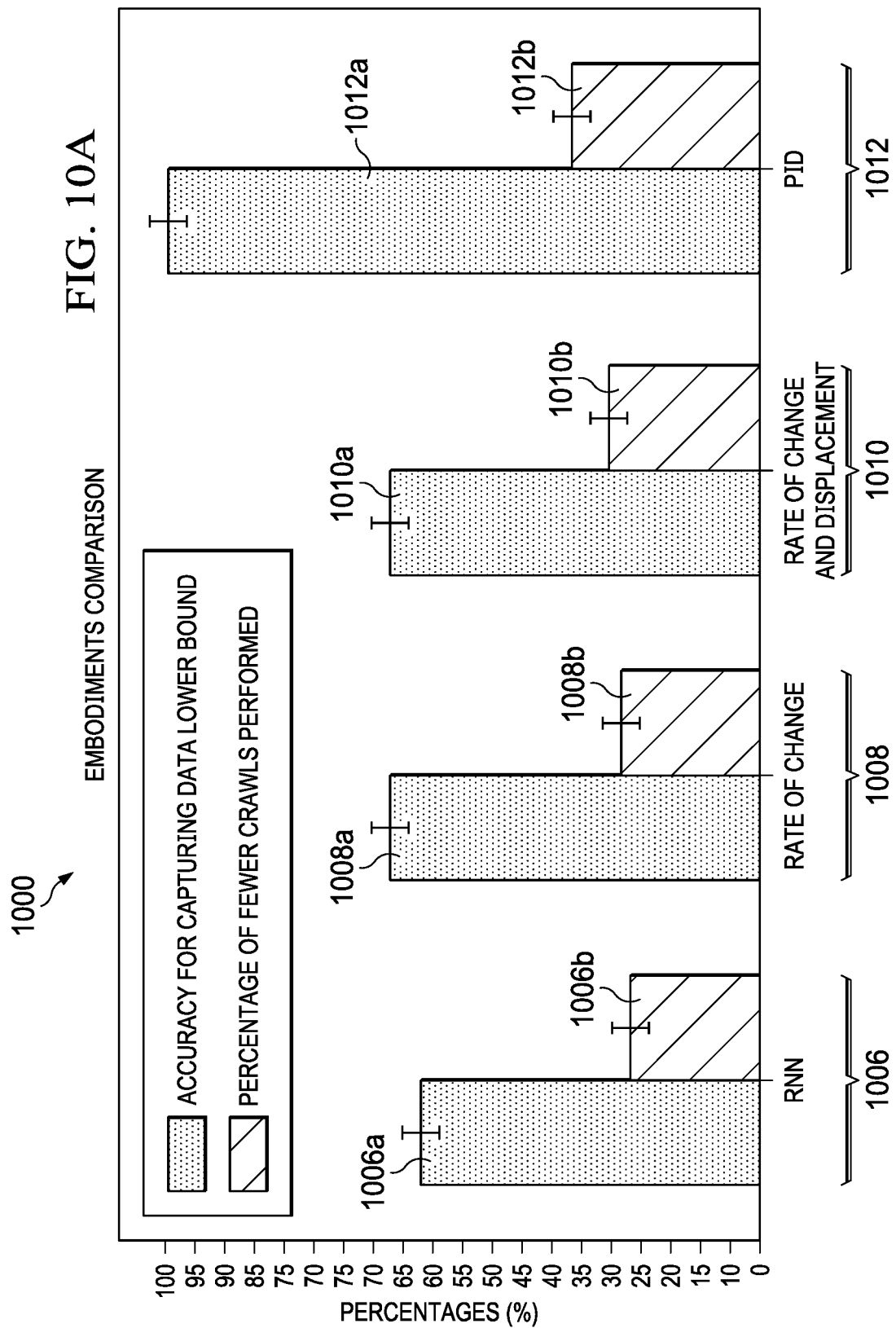

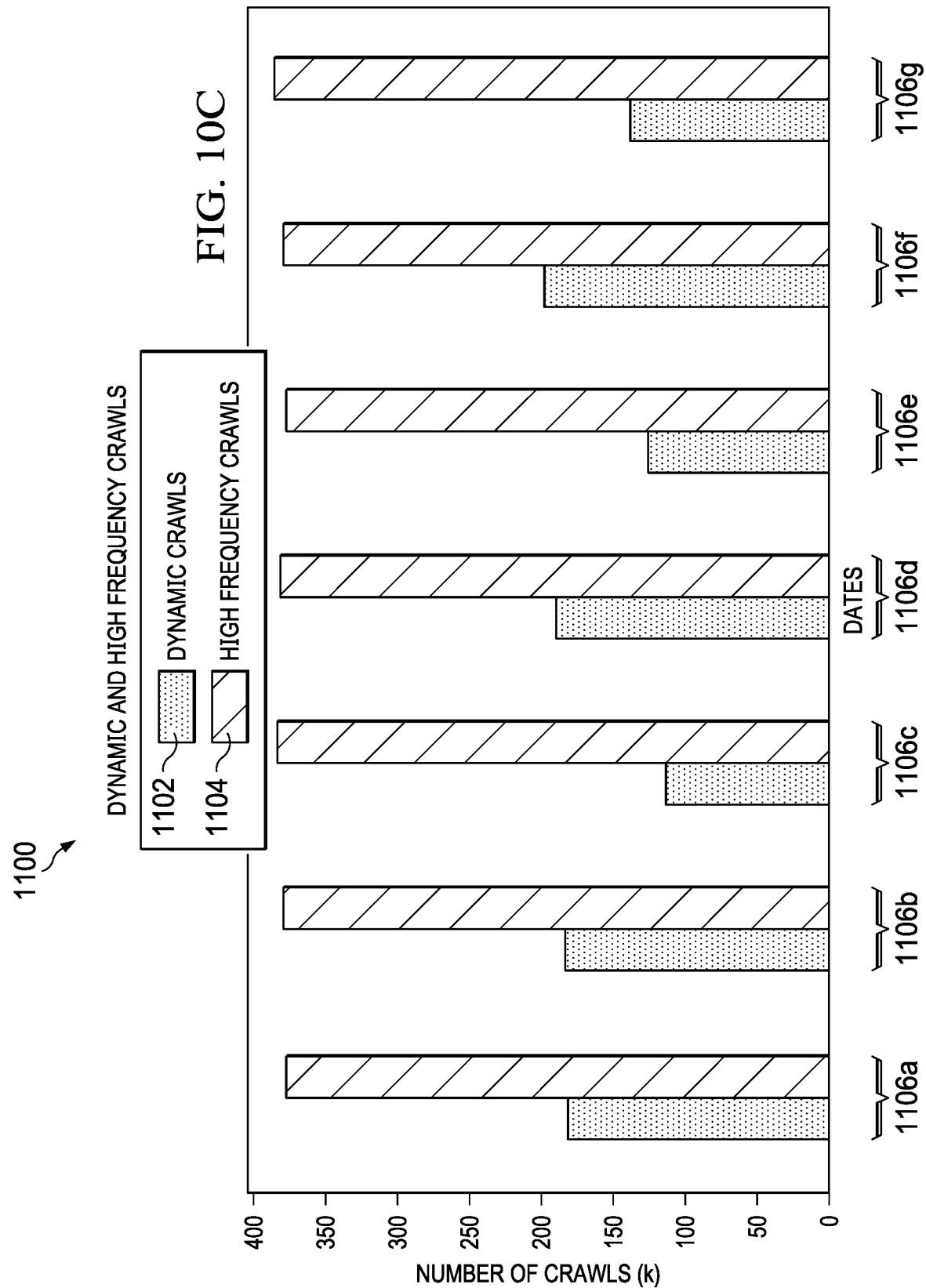

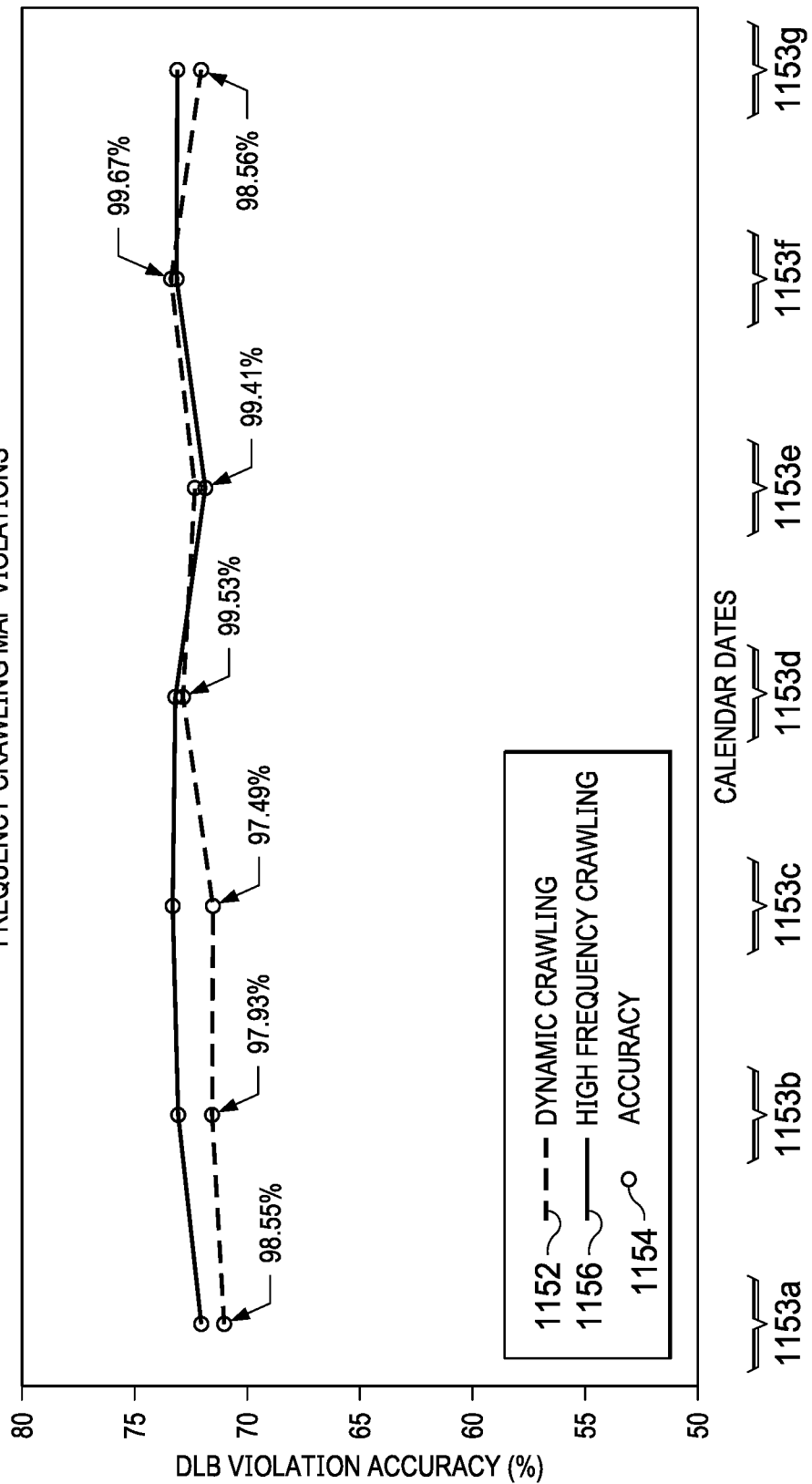

SYSTEM AND METHOD FOR REDUCING CRAWL FREQUENCY AND MEMORY USAGE FOR AN AUTONOMOUS INTERNET CRAWLER

CROSS-REFERENCE TO RELATED APPLICATIONS

This application claims priority benefit from U.S. Provisional Application No. 63/200,918, filed on Apr. 2, 2021. The patent application identified above is incorporated here by reference in its entirety to provide continuity of disclosure.

FIELD OF THE INVENTION

The present invention relates to variable frequency internet crawling systems and high capacity data processing and storage systems.

BACKGROUND OF THE INVENTION

Internet crawlers are used to monitor changes in website content and for routine storage and archiving on large scale commercial websites. This may be done to verify the presence or absence of certain content or to archive website changes over time.

Generally, internet crawlers search a group of selected websites for a defined set of content at a defined search frequency. Search frequency is typically chosen based "computational cost". Computational cost includes the computational resources required to run the crawler, such as speed and network bandwidth, server costs for maintaining the crawler, and storage costs for the data downloaded during crawls. High frequency crawlers provide a lower risk of missing a change in content, but are computationally expensive, in part because they produce a higher percentage of redundant data. Low frequency crawlers provide higher risk of missing a change in content, but are computationally inexpensive.

In typical internet crawling systems, every search produces new rows in several tables in a high capacity storage database. If content does not change, there is a redundant entry in the database and server processing waste (which could be used to crawl another page) as well as unnecessary bandwidth saturation. As the scanned content size increases, computational cost increases exponentially. Therefore, computational cost could be reduced if searches were only performed when there is a high probability of changed content.

A technical challenge in the art of internet crawlers is determining an appropriate search frequency (sampling period) to maximize the informational benefit from the search while minimizing the computational cost.

The prior art has attempted to address this challenge in a number of ways.

For example, U.S. Pat. No. 8,255,385 to Sun, et al. describes a method for determining crawl frequency based on a weighted sum of past frequencies of publication. However, Sun does not consider the rate of change for the desired data.

As another example, U.S. Pat. No. 8,838,571 to Erera, et al. describes a method for updating search engine indexes at different crawl frequencies based on an update type. However, Erera does not describe the use of historical data to predict changes requiring dynamically adaptive crawl rates.

As yet another example, U.S. Pat. No. 8,868,541 to Lin, et al. describes a method for determining crawl frequency based on crawling a plurality of resources multiple times to determine a respective change frequency for each resource wherein the change frequency is based at least partly on detected changes to the resource. However, Lin does not disclose the use of artificial neural networks and in selecting crawl frequency.

Thus, there is a need in the art for an improved system for optimization of crawl frequency which minimizes both computational costs and the risk of missing a content change.

SUMMARY OF THE INVENTION

This invention addresses inefficiencies in adaptive web crawlers and data storage systems.

The system dynamically determines crawl frequency.

In one embodiment, crawl frequency is computed by determining the proportional, integral and derivative contribution of certain data to the system.

In a different embodiment, the system determines the next time to crawl based on both the rate of change and displacement of data. Maximum and minimum wait times between crawls are taken into account for the computation.

In another embodiment, crawl frequency is calculated based on the "rate of change" of data. The system determines the next time to crawl based on the rate of change of data within set parameters, such as maximum and minimum wait times between crawls.

In another embodiment, the system implements a recursive neural network (RNN) using long short-term memory (LSTM) units for a future data prediction. With this information, the system determines the next time to crawl.

It is estimated that prior art high frequency crawl systems produce a 78.65% increase in redundant data stored and increased computational costs compared to the systems disclosed. It is further estimated that prior art low frequency crawl systems miss upwards of 36% of content changes as compared to the systems disclosed.

BRIEF DESCRIPTION OF THE DRAWINGS

In the detailed description of the preferred embodiments presented below, reference is made to the accompanying drawings. Unless otherwise specified, the tolerance on all variable values is preferably ±20%.

FIGS. 1C and 1D is a process flow diagram for an alternate embodiment of an autonomous internet searching and data storage method.

FIG. 2C is a graph of an example data curve and calculation of the integral of e(t).

FIG. 2D is a graph of an example data curve and calculation of the slope for the last time step.

FIG. 2E is a graph of actual data, reconstructed data and crawl frequency of a preferred embodiment.

FIG. 2K is a graph of actual data, reconstructed data and crawl frequency of a preferred embodiment.

FIG. 2N is a graph of actual data, reconstructed data and crawl frequency of a preferred embodiment.

FIG. 7A-7N is an excerpt of code for a preferred embodiment of a recurrent neural network.

FIG. 10A is a bar chart of a comparison of the various embodiments.

FIG. 10C is a bar chart of a comparison of the PID embodiment to the prior art.

FIG. 10D is a plot of a comparison of the PID embodiment to the prior art.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness.

Figure 1A:
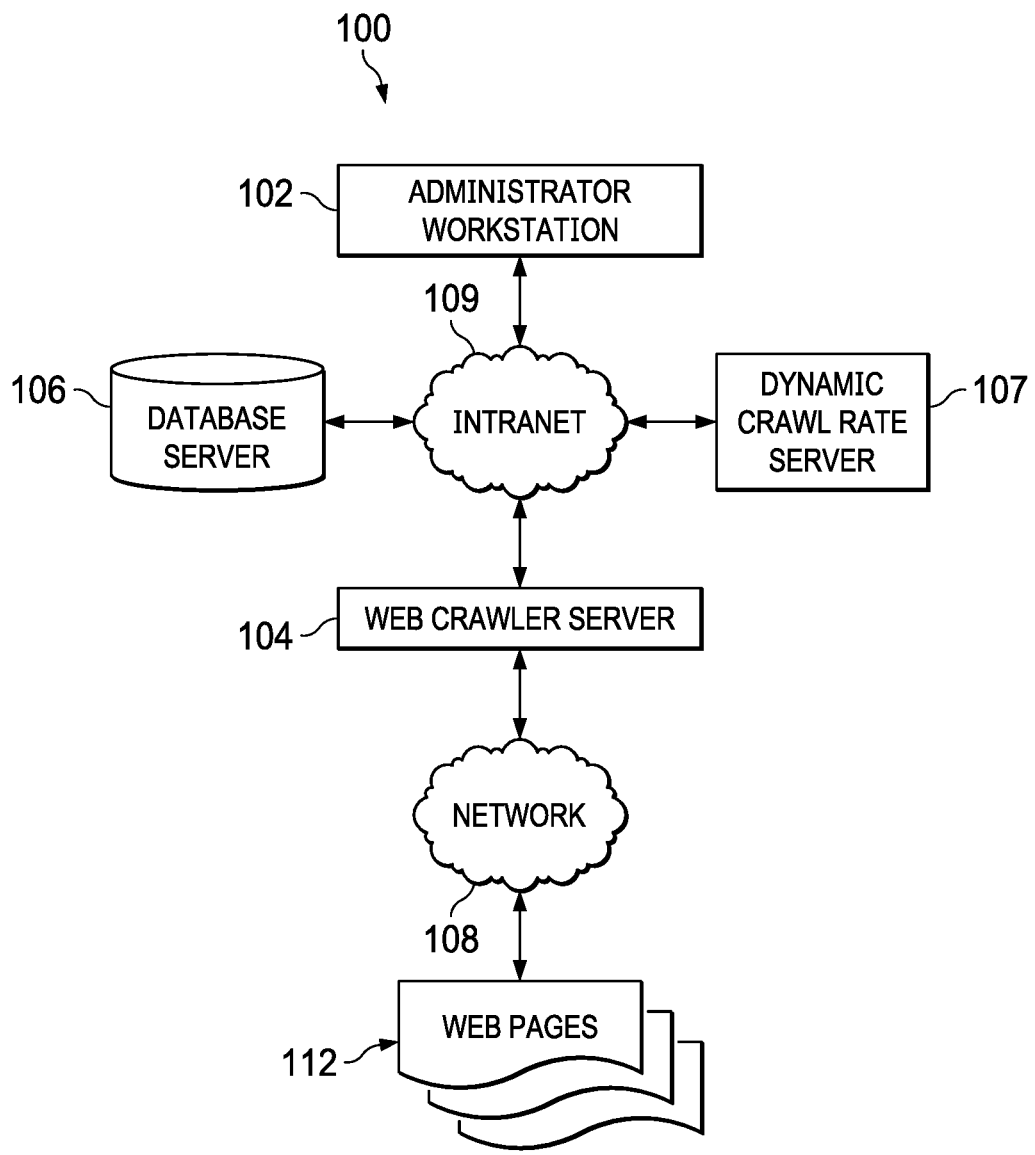
FIG. 1A is an architecture drawing of a preferred embodiment of the system.

In FIG. 1A, an architecture diagram of dynamic crawl rate system 100 will be described.

Dynamic crawl rate system 100 includes database server 106, web crawler server 104, dynamic crawl rate server 107 and administrator workstation 102. All three servers and the workstation are connected to each other through intranet 109. Web crawler server 104 is connected to wide area network 108. Wide area network 108 is preferably the internet. A web crawler application, as will be further described, is resident on web crawler server 104 and retrieves data from webpages 112 through wide area network 108. The web crawler server sends the webpages to database server 106. The web crawler server accesses the webpages and retrieves information from them. Dynamic crawl rate server 107 requests information and processes it, as will be further described. After the data has been processed, dynamic crawl rate server 107 returns an optimized next crawling date and time, which automatically reduces capture and storage of redundant data.

Figure 1B:
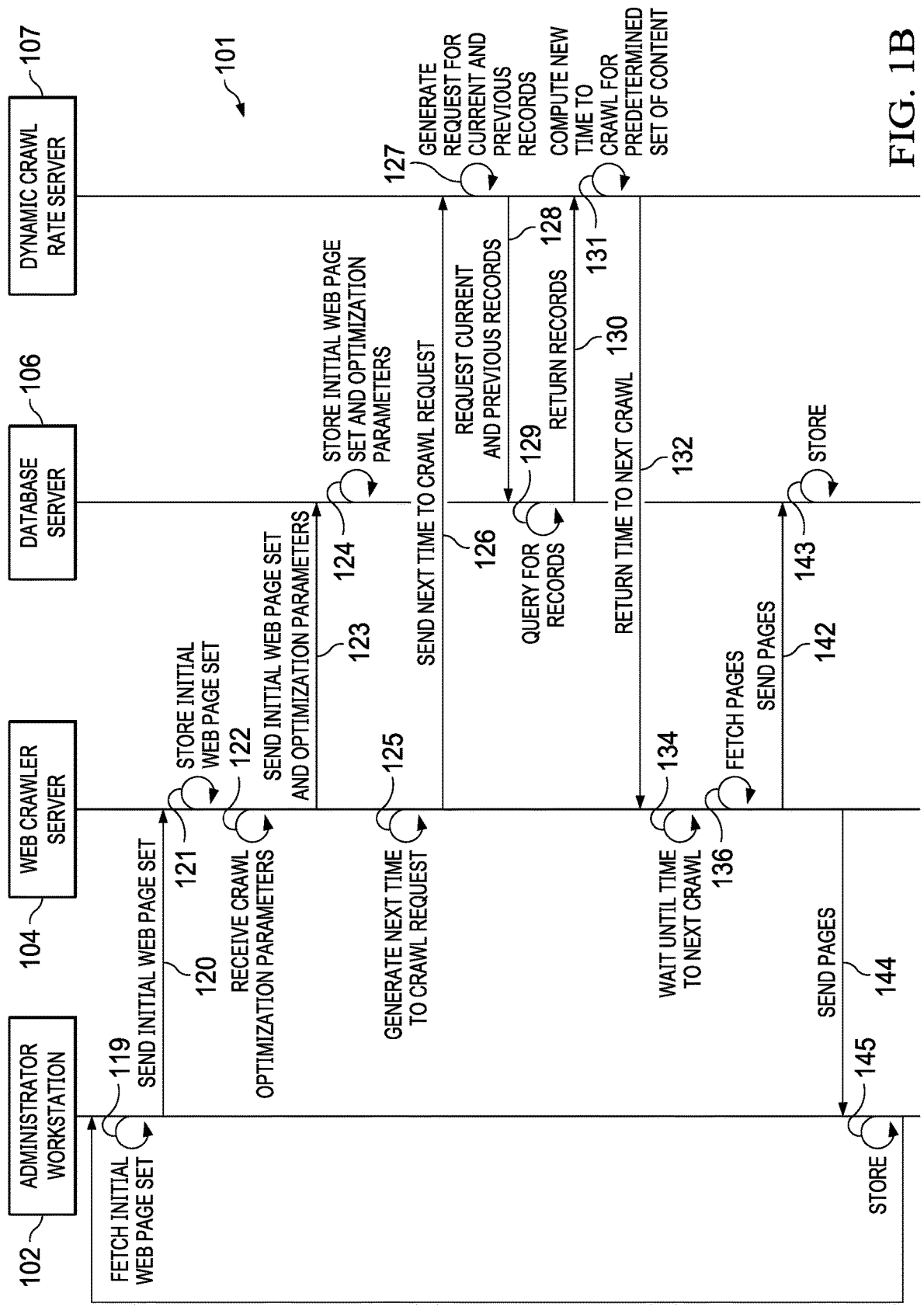
FIG. 1B is a process flow diagram for a preferred embodiment of an autonomous internet searching and data storage method.

Referring then to FIG. 1B, a preferred method of autonomous internet searching 101 will be further described.

At step 119, administrator workstation fetches an initial web page set from any number of servers connected to the internet (not shown).

At step 120, the administrator workstation sends the initial web page set to web crawler server 104.

At step 121, the web crawler server stores the initial web page set.

At step 122, web crawler server 104 receives crawl optimization parameters. Preferably the parameters are input from a GUI resident on administrator workstation 102 and sent to the web crawler server. The crawl optimization parameters include threshold risk (TR), maximum crawl frequency ($C_{max}$), minimum crawl frequency ($C_{min}$), default crawl frequency ($C_{default}$), sensitivity factor ($\alpha$), sensitivity factor ($\beta$) and other parameters, as will be further described.

At step 123, web crawler server 104 sends the initial webpage set and the optimization parameters to database server 106.

At step 124, database server 106 stores the initial web page set and the optimization parameters.

At step 125, web crawler server 104 generates a next time to crawl request.

At step 126, web crawler server 104 sends the next time to crawl request to dynamic crawl rate server 107.

At step 127, dynamic crawl rate server 107 generates a request for current and previous records.

At step 128, dynamic crawl rate server 107 requests current and previous data records for a predetermined set of content from the database server.

At step 129, database server 106 queries for the appropriate records. At step 130, database server 106 returns the current and previous data records to dynamic crawl rate server 107.

At step 131, dynamic crawl rate server 107 computes a new time to crawl for the predetermined set of content, as will be further described.

At step 132, dynamic crawl rate server 107 sends the time to next crawl to web crawler server 104.

At step 134, web crawler server 104 waits until the time to next crawl.

At step 136, web crawler server 104 fetches the requested pages. At step 142, web crawler server 104 sends the requested pages to database server 106.

At step 143, database server 106 stores the requested pages for later use.

At step 144, web crawler server 104, sends the requested webpages to administrator workstation 102.

At step 145, administrator workstation 102 stores the webpages. In a preferred embodiment, administrator workstation 102 replaces the initial web page set of step 119 with the requested pages. The method then returns to step 120.

Figure 1D:
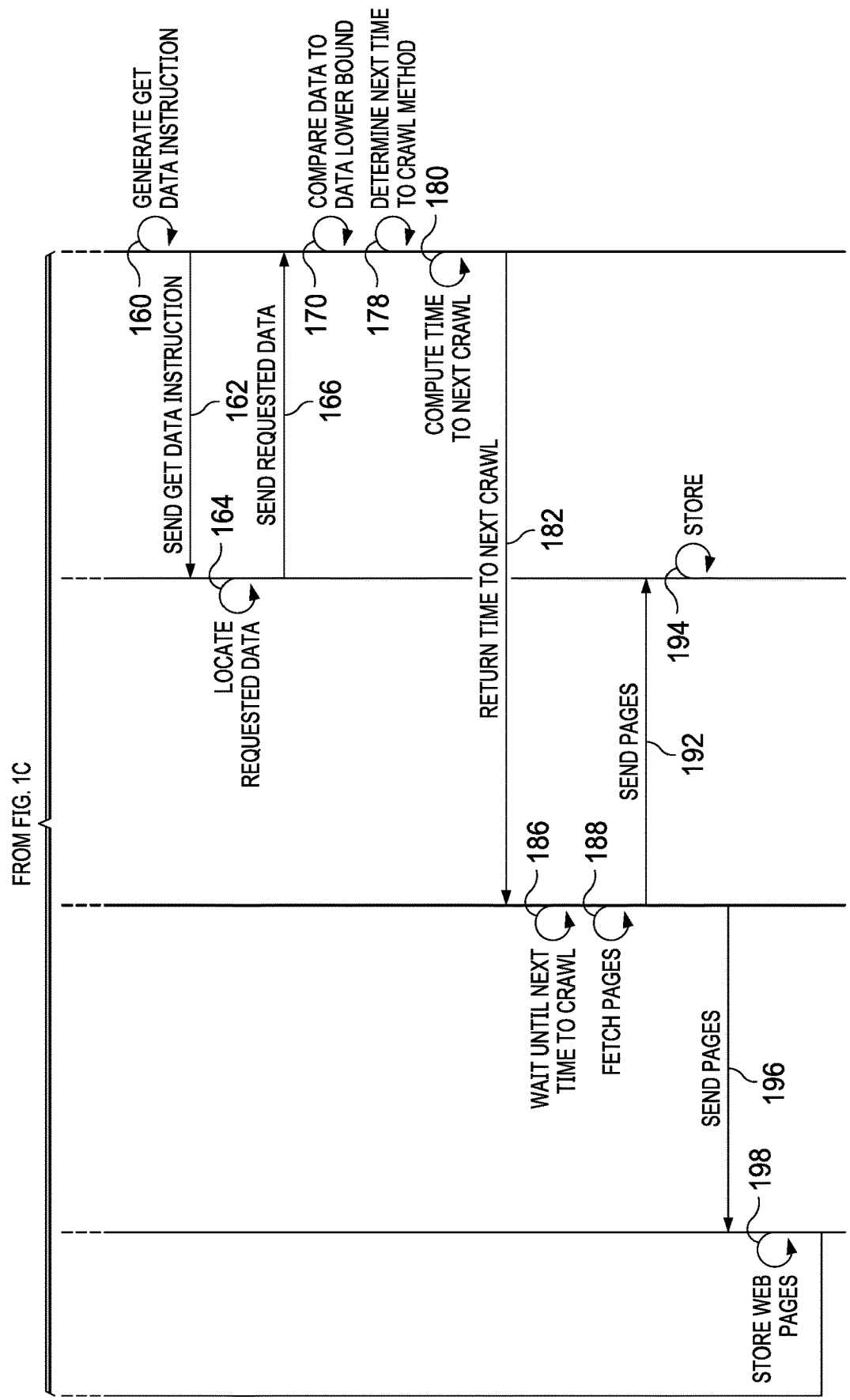

Referring to FIGS. 1C and 1D, an alternate method of autonomous internet searching will be described.

At step 150, administrator workstation 102 fetches an initial web page set from any number of servers connected to the internet.

At step 151, administrator workstation 102 sends the initial webpage set to web crawler server 104.

At step 152, web crawler server 104 stores the initial web page set.

At step 153, web crawler server 104 sets a data lower bound value. At step 154, web crawler server 104 sets an election of a time to next crawl method. In one preferred embodiment, the next time to crawl method includes one of a rate of change method, a rate of change+integral method, a proportional integral derivative ("PID") method, and a recurrent neural network method. Each, in turn, will be further described. Each of these methods is a separate embodiment of an autonomous searching and memory storage routine, but may be used together to maximize the elimination of redundant data storage and crawl efficiency.

At step 155, web crawler server 104 sets a set of crawl optimization parameters, as previously described.

At step 156, web crawler server 104 sends the initial web page set, the crawl optimization parameters and the data lower bound value to database server 106.

At step 157, database server 106 stores the initial web page set, the crawl optimization parameters and the data lower bound value.

At step 158, web crawler server 104 generates a request for next time to crawl message. Preferably, the next time to crawl message includes the data lower bound, the time to next crawl method and the crawl optimization parameters.

At step 159, web crawler server 104 sends the request for next time to crawl message to dynamic crawl rate server 107.

At step 160, dynamic crawl rate server 107 generates a get data instruction. At step 162, the get data instruction is sent from dynamic crawl rate server 107 to database server 106. At step 164 web crawler server 104 examines the initial web page set for the data specified in the get data instruction. At step 166, web crawler server 104 sends data specified to dynamic crawl rate server 107.

At step 170, a comparison is made between the requested data and the data lower bound. If the requested data is less than the data lower bound, then dynamic crawl rate server 107 sets the PID method to determine next time to crawl. If not, then dynamic crawl rate server 107 sets the method to determine next time to crawl as the method elected set in step 154, namely the rate of change method, the rate of change and displacement method, or the recurrent neural network method. At step 178, the particular method chosen to determine time to next crawl method is loaded into memory.

At step 180, dynamic crawl rate server 107 computes the time to next crawl using the time to next crawl method selected. At step 182, the time of the next crawl is sent from dynamic crawl rate server 107 to web crawler server 104.

At step 186, web crawler server 104 waits until the time to next crawl.

At step 188, web crawler server 104 fetches updated webpages, for the initial web page set, from any number of servers connected to the internet. At step 192, web crawler server 104 sends the requested pages to database server 106. At step 194, database server 106 stores the requested pages for later use.

At step 196, web crawler server 104 sends the requested webpages to administrator workstation 102. At step 198, administrator workstation 102 stores the requested webpages, preferably replacing the initial webpage set. The method then returns to step 151.

Figure 2A:
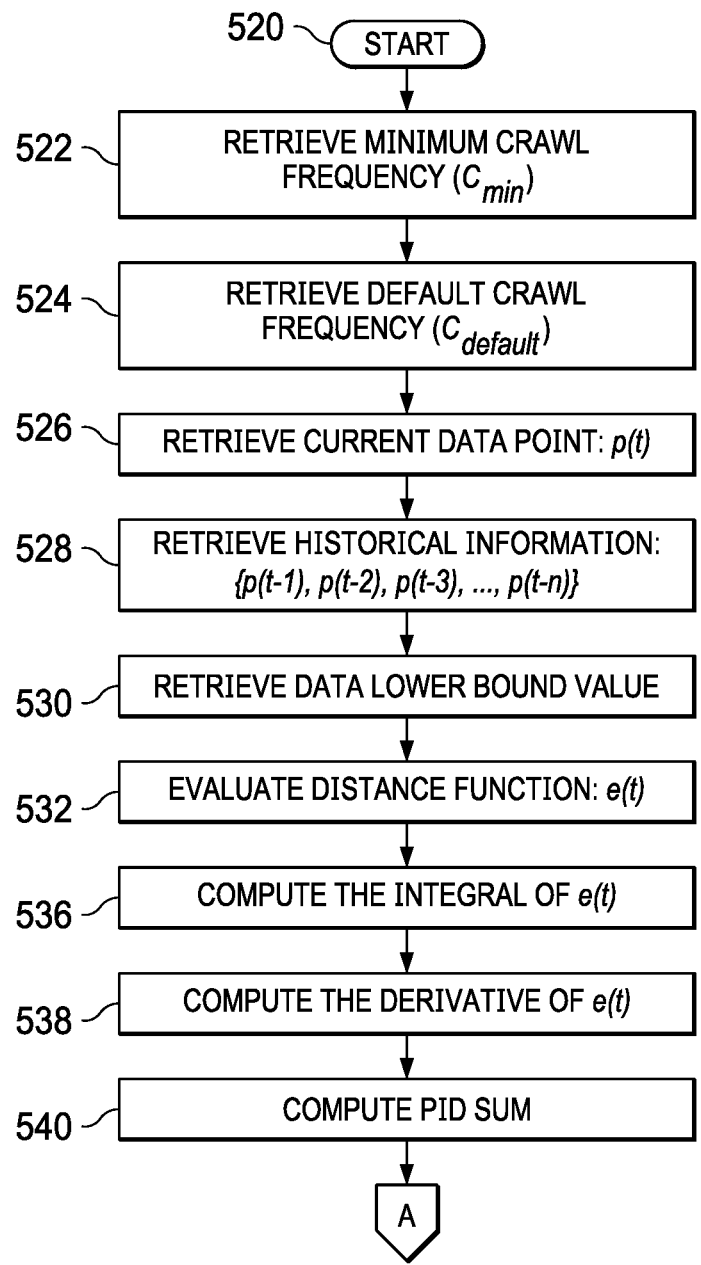
FIGS. 2A and 2B are a flow chart of a preferred embodiment of a method of calculating time to next crawl.

Referring to FIG. 2A, a preferred method of determining time to next crawl using the PID method will be described. In this example, the data is related to a product price and the content information is related product types and product descriptions. Of course, other data and content may be searched and analyzed using the PID method.

At step 520, the method begins.

At step 522, the minimum crawl frequency $C_{min}$ is retrieved from the database. At step 524, the default crawl frequency $C_{default}$ is retrieved from the database.

In a preferred embodiment, $C_{min}$ ranges between about 0 and about 8 hours and $C_{default}$ ranges between about 10 and about 50 hours. Ideally, $C_{min}$=about 8 hours and $C_{default}$=about 24 hours.

At step 526, current product pricing data, p(t) at time t, is retrieved.

At step 528, historical price data for the product {p(t−1), p(t−2), p(t−3), ..., p(t−n),} is retrieved from the database.

At step 530, the data lower bound value is retrieved from the database.

At step 532, the distance function is calculated. The distance function e(t) between a data point below data lower bound, p(t), and the data lower bound, is calculated using the following equation:

$$e(t) = \text{data lower bound} - p(t)$$

Where:

p(t) is a data point below data lower bound.

At step 536, the integral of e(t) is calculated to derive the area between data lower bound value and the data curve. The integral can be computed as follows:

$$\int_{smi}^{emi} e(t)dt = \sum_{i=smi}^{emi} e(t_i)\Delta t$$

Where:

smi is time ($t_b$) at which the data curve falls below the data lower bound value;

emi is time after $t_b$ at which the data curve first rises above the data lower bound value;

$e(t_i)$ is the distance function at i time step; and, $\Delta t$ is the elapsed time between current time step and previous time step.

$$\Delta t = t_i - t_{i-1}$$

At step 538, the derivative of e(t) is calculated as follows. The slope of the derivative at last time step may be derived using the following equation:

$$\left.\frac{d}{dt}e(t)\right|_{t=last} = \left.\frac{e(t) - e(t-1)}{\Delta t}\right|_{t=last}$$

Where:

e(t) is the distance function at last time step;

e(t−1) is the distance function at previous time step;

$\Delta t$ is the elapsed time between last and current time step; and, t=last means evaluated at last time step.

At step 540, the PID sum ("PIDS") is computed using the following equation:

$$PIDS = k_p e(t) + k_i \sum_{i=smi}^{emi} e(t_i)\Delta t + \left. k_d\left(\frac{e(t) - e(t-1)}{\Delta t}\right)\right|_{t=last}$$

Where:

$k_p$ is a proportionality constant. The proportionality constant accompanies e(t) evaluated at t=Current Time. It controls how sensitive the calculation is to a current data lower bound violation. In a preferred embodiment, $k_p$ can be any value in the irrational number set, preferably 0.02;

$k_i$ is the integral constant. $k_i$ accompanies integral of e(t). It controls how sensitive the calculation is to data lower bound violations in the past. Preferably, $k_i$ takes on a continuous value in the irrational number set, preferably 1.8;

e(t) is the distance function at last time step;

e(t−1) is the distance function at previous time step;

Δt is the elapsed time between last and current time step; and, $k_d$ is the derivative constant. $k_d$ accompanies the derivative of e(t). It controls how sensitive the calculation is to possible future violations. Preferably $k_d$ takes on any value in the irrational number set, preferably 0.1.

Figure 2B:
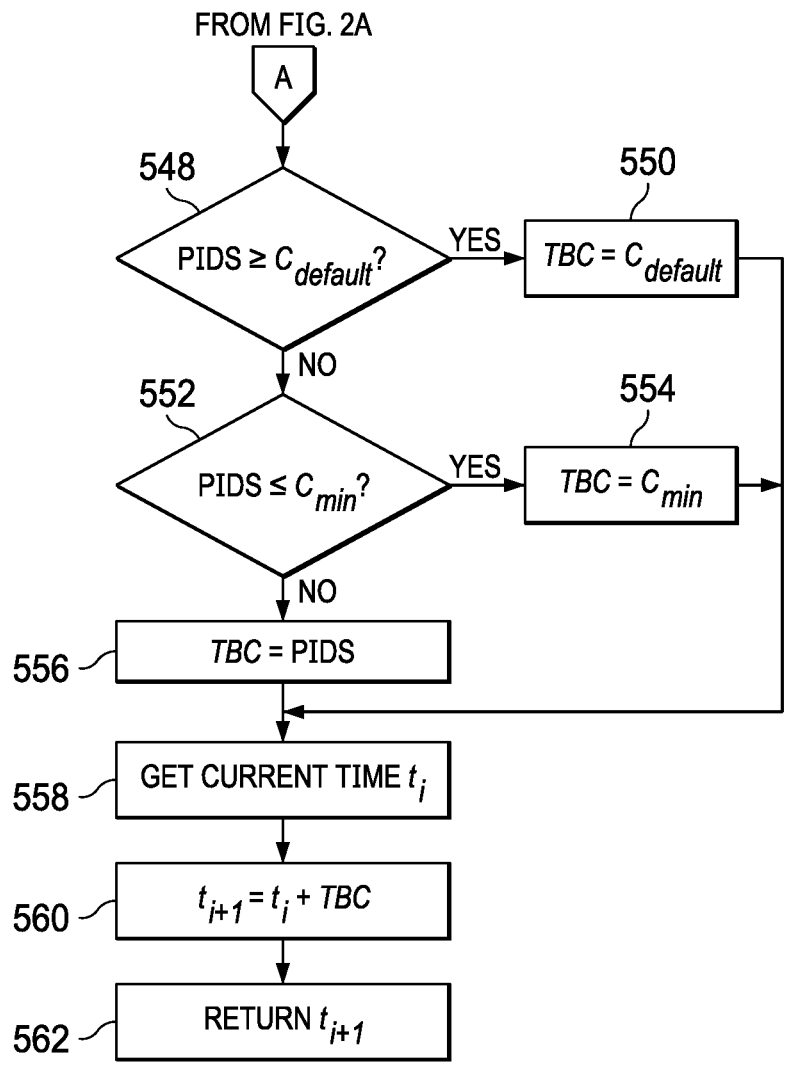

Moving to FIG. 2B, the time between crawls (TBC) is evaluated using the following relationship:

$$TBC = \begin{cases} C_{default} & PIDS \geq C_{default} \\ PIDS & C_{min} < PIDS < C_{default} \\ C_{min} & PIDS \leq C_{min} \end{cases}$$

Where:

$C_{min}$ is a parameter that represents the minimum amount of waiting time allowed between crawls;

$C_{default}$ is the default amount of waiting time between crawls; and

PIDS is the value obtained from calculating a weighted sum of the proportional, integral and derivative sum computations.

At step 548, a comparison is made between the PIDS and $C_{default}$. If the PIDS is greater than or equal to $C_{default}$, then the method moves to step 550. At step 550, it can be inferred that the current data point has not greatly different from the data lower bound value and so $C_{default}$ may be used, hence, TBC is set to $C_{default}$. If not, the method moves to step 552.

At step 552, a comparison is made between the PIDS and $C_{min}$. If the PIDS is less than or equal to $C_{min}$, then the method moves to step 556. If not, the method moves to step 554.

At step 556, the PIDS calculations indicate that the difference between the data lower bound and the data point is considerable, but not urgent, thus, the computed PIDS can be used. Hence, TBC is set to the PIDS.

However, step 554 indicates a critical difference between the data lower bound value and the data point. PIDS calculations dictate that the data point has deviated from the data lower bound by a considerable margin, thus, next crawl should be conducted as soon as possible using $C_{min}$. Hence, TBC is set to $C_{min}$.

At step 558, a synchronized current time value is retrieved from the dynamic crawl rate server. At step 560, next time to crawl, $t_{i+1}$ is derived from the following equation:

$t_{i+1} = t_i + TBC$

Where:

$t_i$ is current time of data retrieval; and,

TBC is the current time between crawls.

At step 562, time between crawls $t_{i+1}$ is returned.

Referring to FIG. 2C, plot 580 is a graphic example of step 536 will be described. Data curve 581 depicts an example of the data changing over time. Exemplary data point values are indicated at points 584. When data curve 581 falls below data lower bound 582, area 583 is calculated between time $t_1$ and time $t_2$, and returned.

Referring to FIG. 2D, plot 585 is a graphic example of step 538 will be described using price data, P, and product content, i. Plot 585 depicts a graph of data versus time for a content, i, over time, t. Price data values are indicated at points 586. Last time step 587 is shown between times $t_1$ and $t_2$. Line 588 is mathematically constructed between data point $P_1$ at time $t_1$ and data point $P_2$ at time $t_2$. The slope of line 588 is derived, as previously described, and here is shown to be positive and increasing. A positive and increasing slope is interpreted to be an "improving" condition. A negative and decreasing slope is interpreted to be a "deteriorating" condition.

Referring to FIG. 2E, plot 5800 of data values 5830, reconstructed data values 5850, prices and dynamic crawling intervals 5870, over time, for the proportional integral derivative approach will be further described. "Reconstructed data values" include a test set of values used for example purposes.

Reconstructed data values 5850 shows data point values at time t, when crawling occurs. Dynamic crawling intervals 5870, are shown as points along line 5890 and indicate spacing intervals 5910 between crawl instances. Analyzing, data values 5830 a close correlation with reconstructed data values 5850 shows a one-to-one correlation between the two curves this indicates that the system crawls at appropriate intervals to capture data changes. Further, in this example, line 5890 show a consistent correlation with data curve changes, at approximately one crawl per day, over a 90-day interval.

Figure 2F:
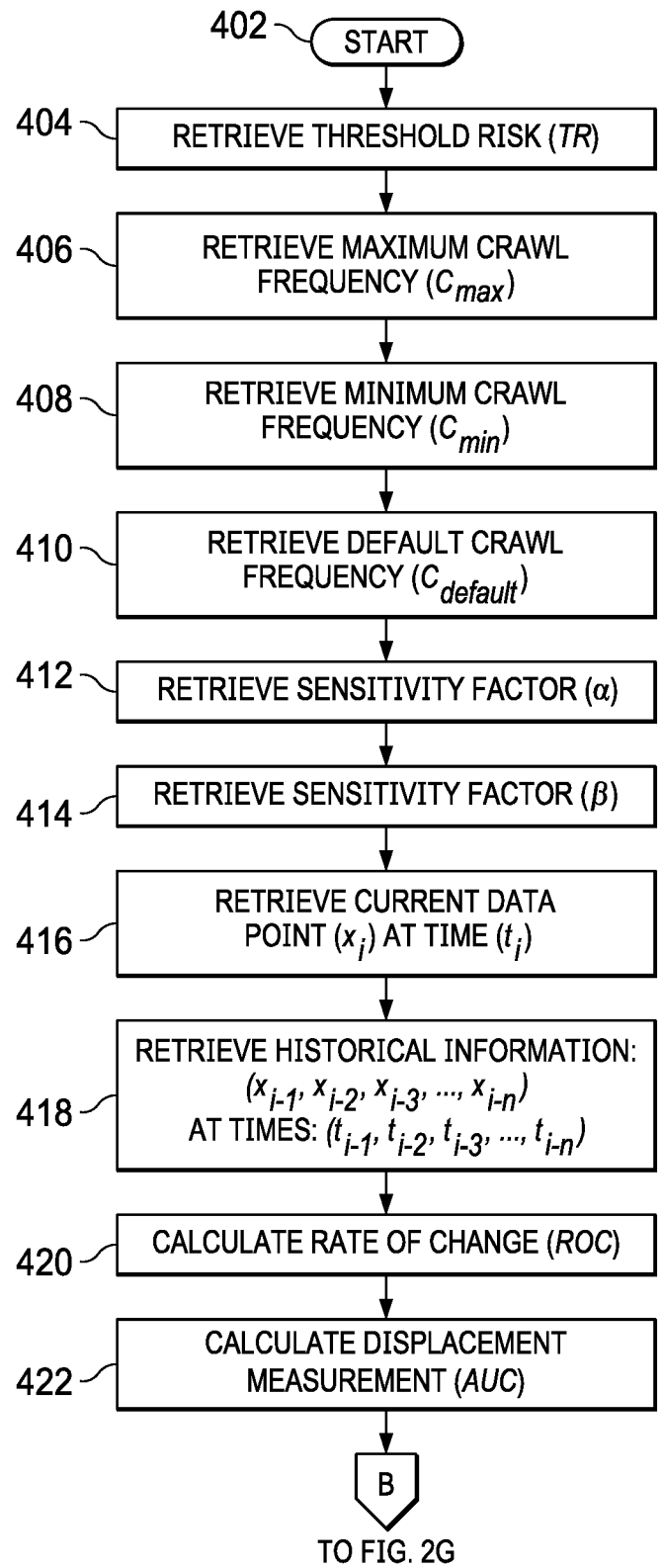
FIGS. 2F and 2G are a flow chart of a preferred embodiment of a method of calculating time to next crawl.

Referring to FIG. 2F, an alternate method of determining time to next crawl, using a "rate of change and displacement" approach, will be described.

At step 402, the method begins. At step 404, a value for TR is retrieved from the database. TR controls the sensitivity of the algorithm to changes in current and previous data. When TR is small, TBC is more sensitive to changes in current and historical data. When TR is large, TBC less sensitive to changes in current and historical data. Hence, only considerable changes in the data are considered significant.

At step 406, a value for maximum crawl frequency $C_{max}$ is retrieved from the database.

At step 408, a value for minimum crawl frequency $C_{min}$ is retrieved from the database.

At step 410, a value for default crawl frequency $C_{default}$ is retrieved from the database.

At step 412, a value for sensitivity "α" is retrieved from the database. α controls the sensitivity of the system to current data changes. At step 414, a value for sensitivity "β" is retrieved from the database. β controls the sensitivity of the system to historical data. Examples of parameters α and β are, in a preferred embodiment, values contained in the irrational numbers set. Preferable values for α and β are 32 and 864, respectively.

At step 416, the current data point, $x_i$, is retrieved from the database at the current time, $t_i$. At step 418, historical data points, $(x_{i-1}, x_{i-2}, x_{i-3}, \ldots, x_{i-n})$, at corresponding time steps $(t_{i-1}, t_{i-2}, t_{i-3}, \ldots, t_{i-n})$ are retrieved from the database.

At step 420, the data rate of change ("ROC") is calculated, as will be further described.

At step 422 the displacement measurement is calculated, as will be further described.

Figure 2G:
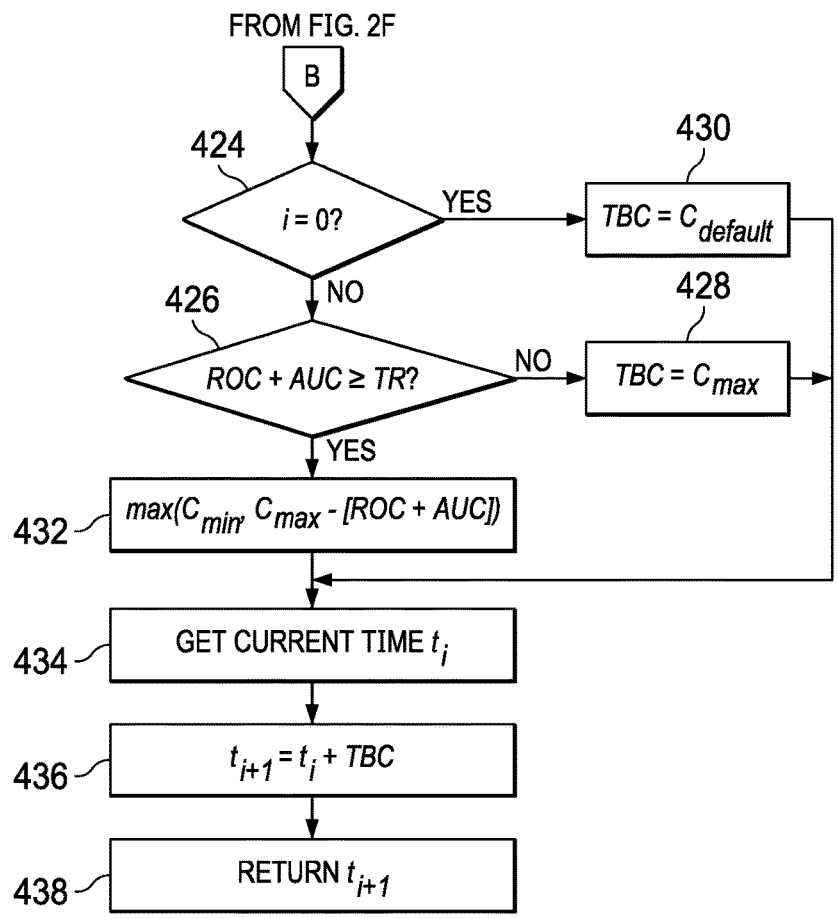

Moving to FIG. 2G, TBC is evaluated using the following relationship:

$$TBC = \begin{cases} \max(C_{min}, C_{max} - [ROC + AUC]), & [ROC + AUC] \geq TR \\ C_{default}, & i = 0 \\ C_{max}, & \text{Otherwise} \end{cases}$$

Where:

$C_{min}$ is the minimum amount of waiting time allowed between crawls;

$C_{max}$ is the maximum amount of waiting time between crawls;

$C_{default}$ is the default amount of waiting time between crawls;

ROC is the rate of change of data;

AUC is the area under the data curve; and,

TR is a non-negative number between 0 and 1.

In a preferred embodiment, $C_{max}$ ranges between about 24 and about 48 hours, $C_{min}$ ranges between about 1 and about 8 hours and $C_{default}$ ranges between about 9 and about 24 hours. Ideally, $C_{max}$=about 48 hours, $C_{min}$=about 8 hours and $C_{default}$=about 24 hours.

At step 424, the value of i is evaluated to determine whether or not it is zero. i=0 at system startup. This is a special case, there is no previous data, meaning the system only carries one value, thus, distance and area between pieces of information cannot be obtained. If so, the method moves to step 430. If not, the method moves to step 426.

At step 430, TBC is set to $C_{default}$, and the method moves to step 434.

At step 426, a comparison is made between the sum of ROC and AUC, and the value of TR. If the sum is greater than or equal to TR, then the method moves to step 432. If the sum is less than TR, then the method moves to step 428.

At step 428, TBC is set to $C_{max}$. When TBC=$C_{max}$, a condition is known as "adaptive sampling rate" exists and indicates that it is reasonable to increase the waiting time between crawls if monitored data is relatively static and no considerable variation over time can be observed. The method then moves to step 434.

At step 432, TBC is set to the greater of the value of $C_{min}$ and the value of $C_{max}$−(ROC+AUC). If data has changed considerably in the past, or a large rate of change measured at $t_i$ and $t_{i-1}$, then the waiting time between crawls is decreased. In this case, the change between previous information and actual information, as well as historical data does not add applicable information to TBC, so it is possible to wait the "maximum" amount of time $C_{max}$. The method then moves to step 434.

At step 434, the method retrieves the current time, $t_i$, from the database.

At step 436, next time to crawl, $t_{i+1}$, is calculated from the following equation:

$$t_{i+1} = t_i + TBC$$

Where:

$t_i$ is the current time of data retrieval; and,

TBC is the current value of time between crawls.

At step 438, $t_{i+1}$ is returned.

Figure 2J:
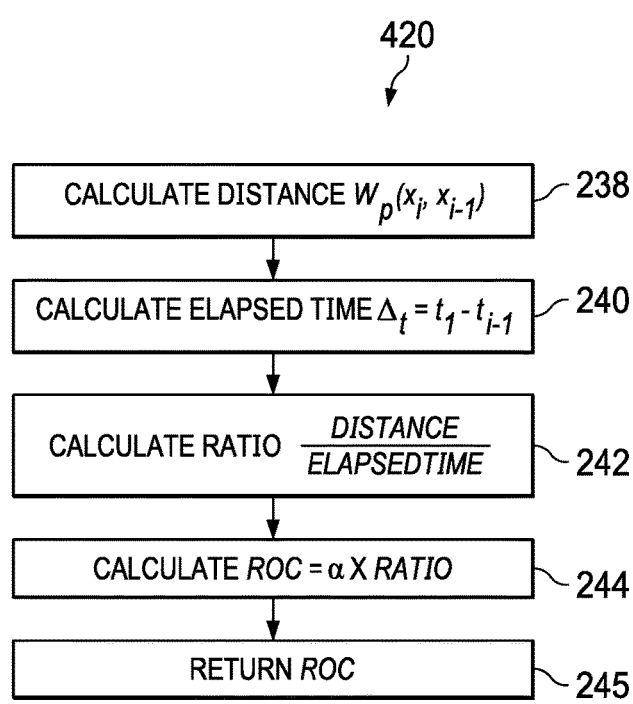
FIG. 2J is a flow chart of a preferred embodiment of calculating the rate of change of price data.
Figure 2H:
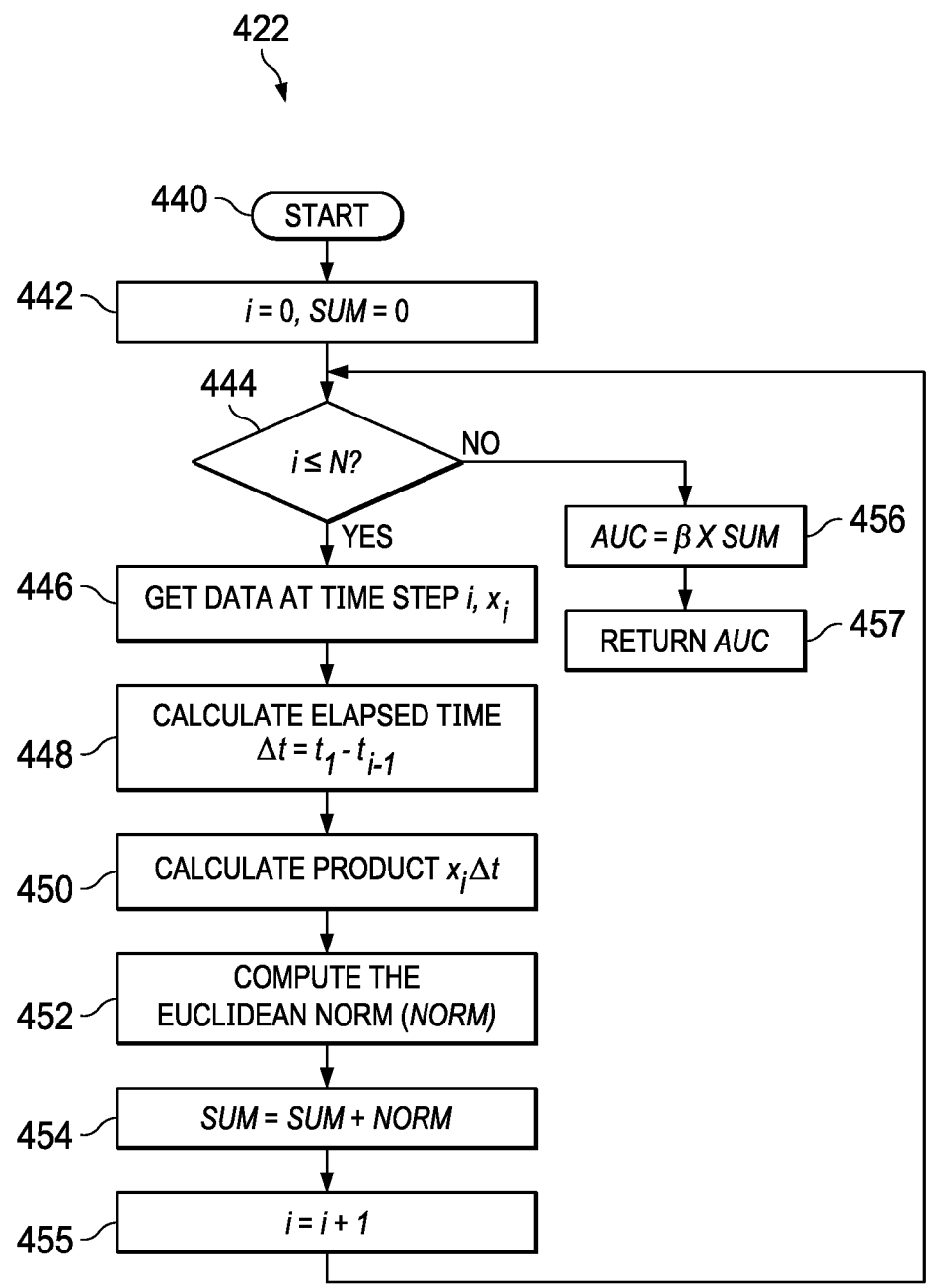
FIG. 2H is a flow chart of a preferred embodiment of calculating a displacement measurement.

Referring to FIG. 2H, step 422 will be further described. The displacement measurement can be estimated by estimating the area under the curve "AUC." AUC numerically measures how much has the data changed in the past giving valuable information to conduct predictions for future measurements. AUC can be estimated using the following equation:

$$AUC = \beta \sum_{i=1}^{N} \|x_i \Delta t\|$$

Where:

$\beta$ is a tuning constant that determines how sensitive the computation is to change historical data. The value of $\beta$ can range within the following interval:

$$0 \leq \beta \leq C_{max}$$

N is the number of data points at the time of the measurement;

$x_i$ is a vector containing the data curve;

$\Delta t$ is the elapsed time calculated as:

$$\Delta t = t_i - t_{i-i}$$

At step 440, the method begins.

At step 442, the values of "i" and "sum" are set to zero.

At step 444, a comparison is made between the value of "i" and "N".

Where:

i is the iteration number for the system; and,

N is the number of data points at the time of the measurement.

If i is less than or equal to the value of N, then the method moves to step 446. If not, then the method moves to step 456.

At step 446, data value at time step i, $x_i$, is retrieved from the database.

At step 448, the elapsed time, $\Delta t$ is calculated. At step 450, the method calculates the product of the current value, $x_i$ and the elapsed time $\Delta t$.

At step 452, the Euclidean norm of the product $x_i \Delta t$ is calculated.

At step 454, the value of sum is updated by the value of the Euclidean norm. At step 455, time step i is incremented by 1. Then the method returns to step 444, and the process is repeated until the final time step is reached.

At step 456, the value of the area under the curve is calculated according to the following equation.

$$AUC = \beta \times SUM$$

Where:

$\beta$ is a proportionality constant, which can take on any value in the irrational number set; and, SUM is the running total of the area under the curve.

At step 457, the value of AUC is returned.

Figure 2I:
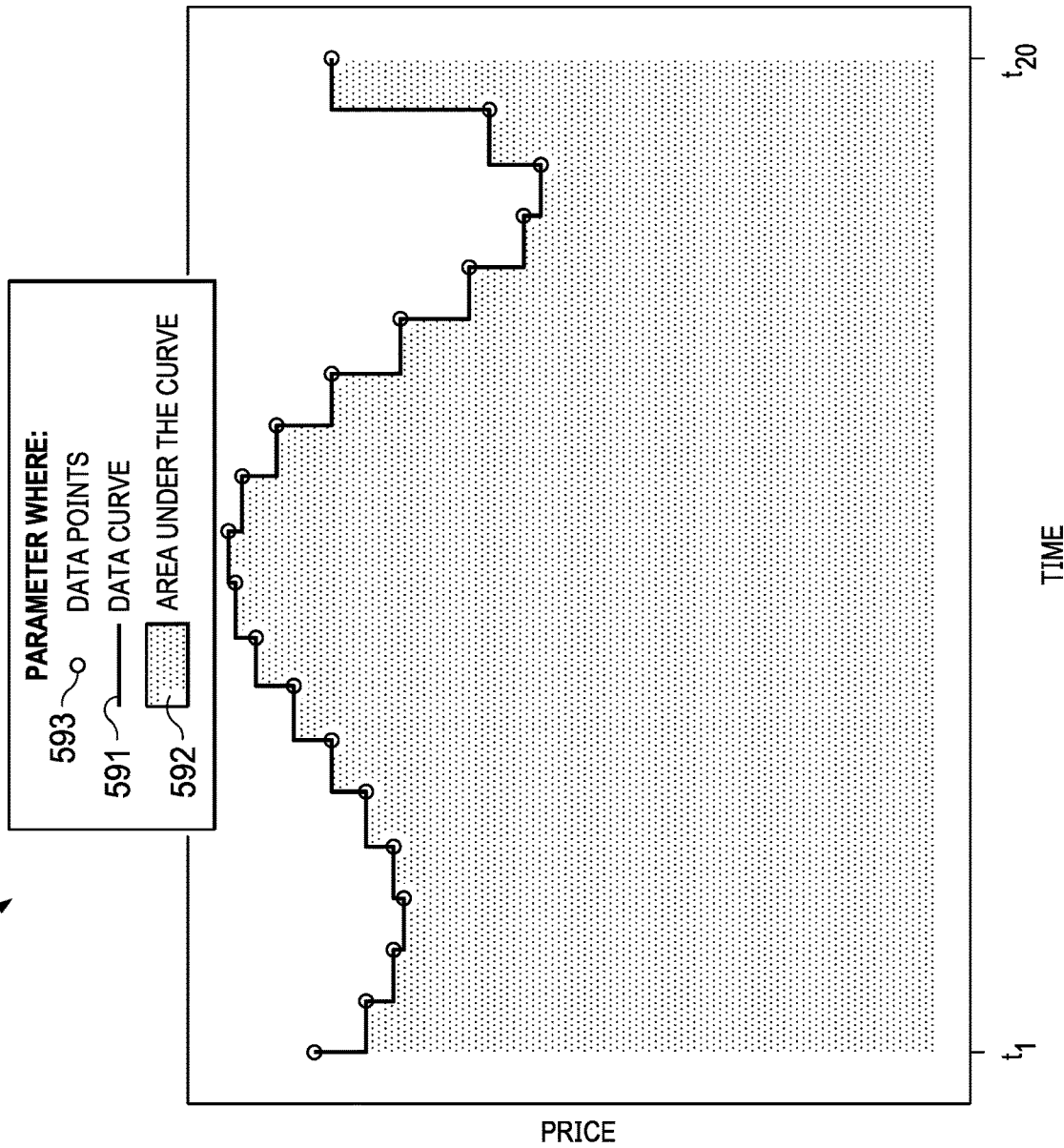
FIG. 2I is a graph of an example data curve, and calculation of area under the curve.

Referring to FIG. 2I, a graphic example of the execution of step 422 will be further described. Plot 590 depicts, as an example of a data curve, data points versus time, in time steps. Data curve 591 is shown between time $t_1$ and time $t_{20}$ for price data points 593. Area under the curve 592 is shown between $t_1$ and time $t_{20}$.

Referring then to FIG. 2J, step 420, calculating the ROC, will be further described.

To determine ROC, the algorithm computes a novel ratio of the "distance of the data" between two data "positions", namely the current crawl data and the previous crawl data, and the "difference in time" between them. This can be interpreted as the rate of change for data positions processed with respect to time. In other words, a "data velocity" measurement. "Data velocity" can be understood as the measurement of the amount of distance an object covers in a given amount of time. ROC can be derived from the following equation:

$$ROC = \alpha \frac{W_p(x_i, x_{i-1})}{\Delta t}$$

Where:

α is a tuning constant that determines the sensitivity of the change. The value of α can range within the following interval:

$$0 \leq \alpha \leq C_{max}$$

$C_{max}$ represents the maximum waiting time for the next crawl;
$W_p$ is the Wasserstein distance; and,
$\Delta t$ is the elapsed time between the current crawl time and the next crawl time, evaluated as:

$$\Delta t = t_i - t_{i-1}$$

The distance function is defined to numerically measure how far apart the two pieces of information within vectors $x_i$ and $x_{i-1}$ are. Since $t_i$ and $t_{i-1}$ are measurements of time, relation between mentioned variables can be expressed as:

$$t_i > t_{i-1}$$

At step 238, the Wasserstein distance function between probability distributions is calculated as described in the following paragraphs.

For $p \geq 1$, $Pp(M)$ denotes the collection of all probability measures μ on M with finite $p^{th}$ moment. Then, there exists some $x_0$ in M such that:

$$\int_M d(x, x_0)^p d\mu(x) < \infty$$

The $p^{th}$ Wasserstein distance between two probability measures μ and v in $P_p(M)$ is defined as:

$$W_p(x_i, x_{i-1}) := \left( \inf_{\gamma \in \Gamma(x_i, x_{i-1})} \int_{M \times M} d(x, y)^p d\gamma(x, y) \right)^{\frac{1}{p}}$$

Where:
$x_i$ and $x_{i-1}$ are two vectors containing price information.
(M, d) is a metric space for which every probability measure on M which is a radon space; and,
$\Gamma(x_i - x_{i-1})$ stands for the collection of all measures M×M with marginals $x_i$ and $x_{i-1}$ on the first and second factors, respectively.

The above distance is usually denoted $W_p(\mu, v)$ or $l_p(\mu, V)$.
The Wasserstein metric may be equivalently defined by:

$$W_p(\mu,v)=(\inf E[d(X,Y)^p])^{1/p}$$

Where:
E[Z] denotes the expected value of a random variable Z and the infimum is taken over all joint distributions of the random variables X and Y with marginals μ and v respectively.

At step 240, elapsed time $\Delta_t$ is calculated.
At step 242, the ratio of the Wasserstein distance per elapsed time is calculated.
At step 244, the ratio is multiplied by factor α to derive ROC.
At step 245, ROC is returned.

Referring them to FIG. 2K, plot 5900 shows an example of the rate of change and displacement embodiment and will be further described.

Plot 5900 shows an exemplary plot of data values 5950, reconstructed data values 5960, dynamic crawling intervals 5970, and data lower bound 5940. Reconstructed data values 5960 show a fairly close correlation with data values 5950. Indicating that the algorithm controls the crawling frequency with sufficient reliability to observe data changes with acceptable accuracy. Dynamic crawling intervals, shown at line 5980, show increased frequency 5990a, as the rate of change and displacement increases in data values 5950, at 5991a. Similarly, dynamic crawling intervals 5990b show increased frequency when data values 5950 falls below data lower bound 5940, and also increased frequency in data values 5950, at 5991b.

Figure 2L:
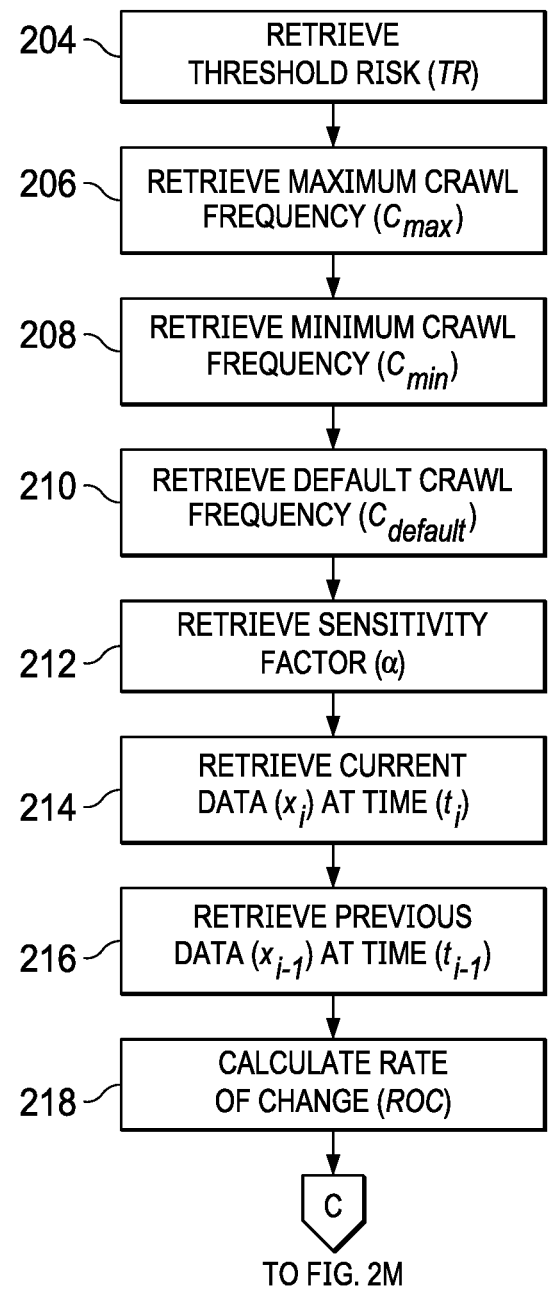
FIGS. 2L and 2M are a flow chart of a preferred embodiment of determining next time to crawl.

Referring to FIG. 2L, an alternate method of determining time to next crawl using a "rate of change" approach, will be further described.

At step 204, TR is retrieved from the database.
At step 206, maximum time to next crawl $C_{max}$ is retrieved from the database. At step 208, minimum time to next crawl $C_{min}$ is retrieved from the database.
At step 210, default time between crawls $C_{default}$ is retrieved from the database. In a preferred embodiment, $C_{max}$ ranges between about 24 and about 48 hours, $C_{min}$ ranges between about 1 and about 8 hours and $C_{default}$ ranges between about 9 and about 24 hours. Ideally, $C_{max}$=about 48 hours, $C_{min}$=about 8 hours and $C_{default}$=about 24 hours.
At step 212, tuning constant α is retrieved from the database. α determines the sensitivity to changes in data. In a preferred embodiment, α can take on any irrational number value.
At step 214, current data point ($x_i$) at time ($t_i$) is retrieved from the database. At step 216, previous data point ($x_{i-1}$) and the time between the retrieval of x, and $x_{i-1}$, ($t_i, t_{i-1}$) are retrieved from the database.
At step 218, ROC is calculated, as has been previously described.

Figure 2M:
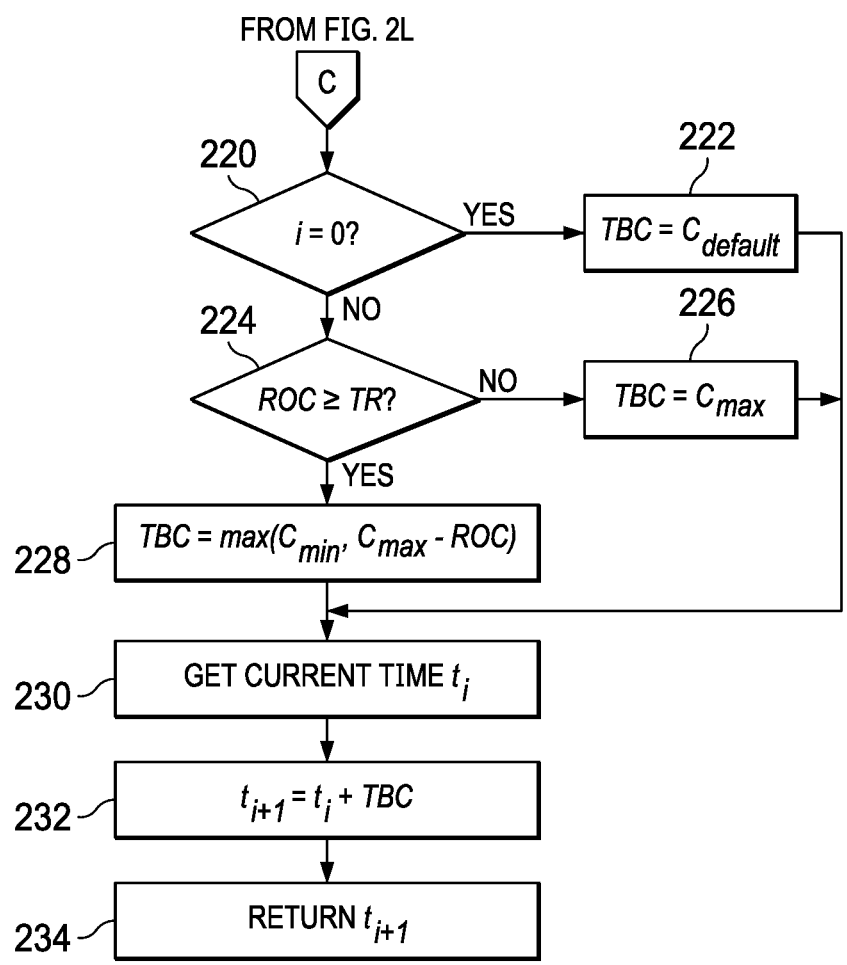

Continuing with FIG. 2M, step 220 addresses the case where there is no previous data, meaning the system only carries one value, thus, distance between two pieces of information cannot be obtained. If there is no previous data, then the method moves to step 222. Step 222 returns the previously defined $C_{default}$, value as TBC, and then moves to step 230.

If there is previous data, then i≠0 and the method moves to step 224.
Time between crawls is evaluated using the following relationship:

$$TBC = \begin{cases} \max(C_{min}, C_{max} - ROC), & ROC \geq TR \\ C_{default}, & i = 0 \\ C_{max} & \text{Otherwise} \end{cases}$$

Where:
$C_{min}$ represents the minimum amount of waiting time allowed between crawls;
$C_{max}$ represents as the maximum amount of waiting time between crawls;
$C_{default}$ represents the default amount of waiting time between crawls;
ROC represents rate of change; and,
TR represents threshold risk.

At step 224, the case of adaptive sampling rate is addressed. If ROC is greater than or equal to TR, then the method moves to step 228. If ROC is less than TR, then the method moves to step 226.

At step 228, TBC is set to the larger of two values, parameter $C_{min}$ or the difference between $C_{max}$ and ROC. This case shows that it is reasonable to increase the waiting time between crawls if monitored data is relatively static and no considerable variation can be observed. If data changes rapidly, then the waiting time between crawls should be decreased. The method then moves to step 230.

At step 226, the case when data values are not considered relevant is addressed. At step 226, TBC is set to $C_{max}$. The change between previous data values and current data values does not add applicable information to TBC, so it is possible to wait the "maximum" amount of time, $C_{max}$. The method then moves to step 230.

At step 230, the current time is retrieved from the server.

At step 232, next time to crawl, $t_{i+1}$ can be obtained from the following equation:

$$t_{i+1} = t_i + \text{TBC}$$

Where:
$t_i$ current time of data retrieval; and,
$t_{i+1}$ is the time to next crawl.

At step 234, $t_{i+1}$ is returned.

Referring to FIG. 2N, the rate of change embodiment will be further described using plot 5690 as an example. Plot 5690 shows data values 5700, reconstructed data values 5710 and dynamic crawling intervals 5720, for an example of the rate of change approach. Data values 5700 and reconstructed data values 5710 show a fairly close correlation, indicating that a high percentage of changes in the data has been recognized by the algorithm. Dynamic crawling intervals 5720, shown at line 5730, show increased crawl frequency, 5740a, when the rate of change in data values 5700a, is increased. Similarly, increased dynamic crawling interval 5740b, corresponds with an increased rate of change in data values at 5700b. Likewise, increased frequency in dynamic crawling intervals 5740c, is shown to correspond with a large rate of change in data values 5700c.

Figure 3A:
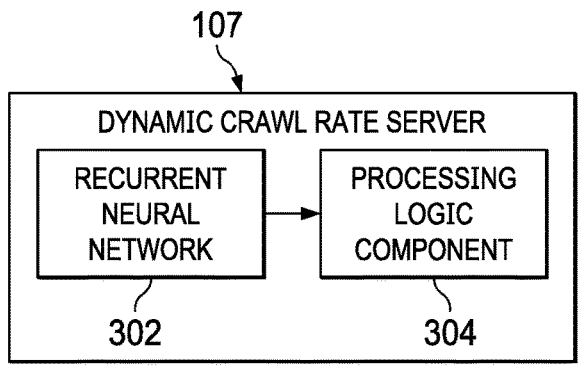
FIG. 3A is a drawing of the modules within a preferred embodiment of the dynamic crawl rate service for obtaining crawl frequency using a recurrent neural network.

Referring to FIG. 3A, in an alternate embodiment, dynamic crawl rate server 107 is provided with a system of two cooperating modules, recurrent neural network ("RNN") 302, and processing logic component 304, as will be further described.

Figure 3C:
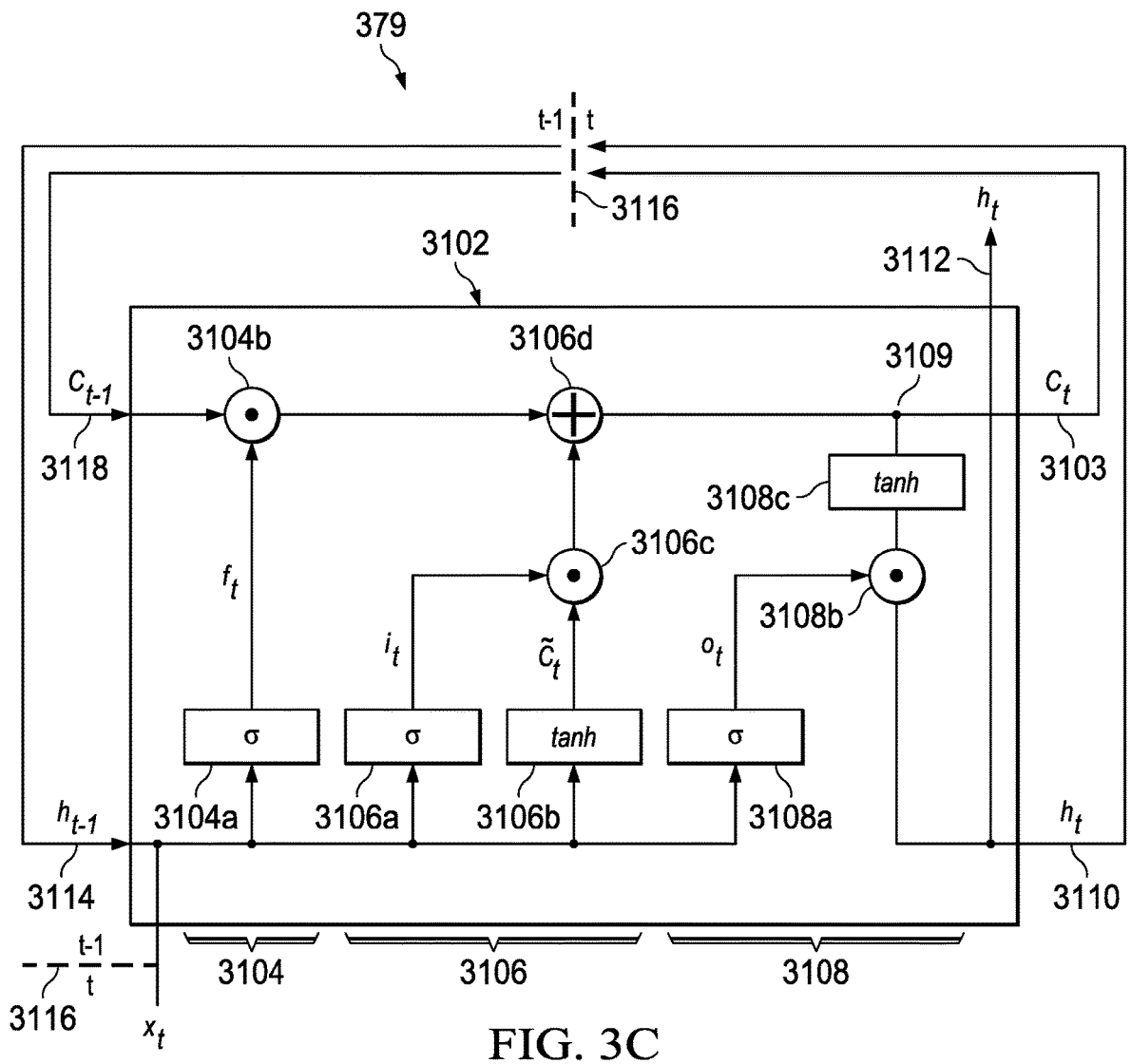
FIG. 3C is a diagram showing the nodes within a LSTM unit.
Figure 3B:
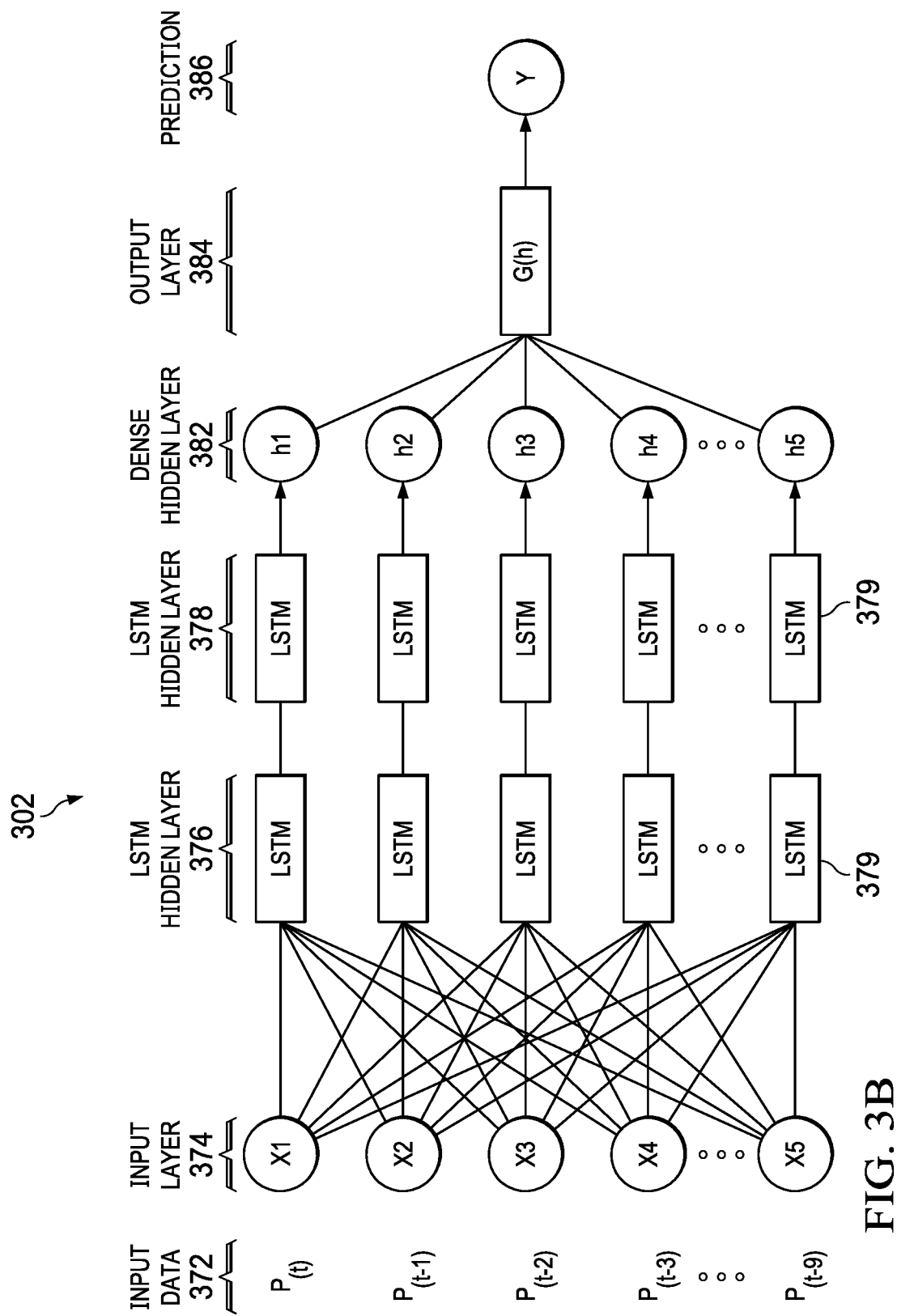
FIG. 3B is a node diagram of a preferred recurrent neural network.

Referring to FIG. 3B, a preferred artificial neural network, RNN 302 will be further described. RNN 302 preferably is implemented by the Keras API, and the TensorFlow Library. RNN 302 includes input layer 374 that receives input data 372. The data is passed to LSTM hidden layers 376, 378 and dense hidden layer 382 before passing to output layer 384. The output layer provides prediction 386. In RNN 302, the hidden LSTM layers receive input from both the input layer and its own output from a previous time step. In a preferred embodiment, two stacked LSTM hidden layers are provided. LSTM hidden layer 376 receives its input from both the input layer and its own outputs from a previous time step. LSTM hidden layer 378 receives its input from LSTM hidden layer 376 and its own outputs from a previous time step. The flow of information in contiguous time steps through the layers allows the network to have a memory of past events. Each of LSTM hidden layers 376 and 378 are comprised of interlinked LSTM memory cells 379, as will be further described.

LSTM hidden layers 376 and 378 will process the time-data sequences. The output of the LSTM hidden layer 378 is directed to the input of dense hidden layer 382. In a preferred embodiment, dense hidden layer 382 takes the form of 20 neurons using the tan h activation function. In another embodiment, the activation function may take the form of the leaky ReLU activation function. The leaky ReLU activation function avoids the vanishing gradient problem and is less computationally expensive than either the tan h or Sigmoid functions. The dense hidden layer is finally connected to the output layer consisting on a single neuron with the identity function.

Input layer 374 receives a vector of input data 372, of length 10, containing a sequence starting with the current data value and 9 more data values, corresponding to the previous 9 time steps as follows:

$$[p(t), p(t-1), p(t-2), p(t-3), \ldots, p(t-9)]$$

In a preferred embodiment, the recurrent neural network applies a loss function which quantifies the error between predicted values and expected values. Mean squared error (MSE) is designated as the loss function due to the emphasis that it gives to outliers. Outliers presented within the data represent anomalies. MSE is also a differentiable function which is needed for the proper convergence of the optimization algorithm. MSE is calculated according to the following equation.

$$MSE = \frac{1}{n}\sum_{i=1}^{n}(y_i - \hat{y}_i)$$

Where:
n is the to total number of elements;
$y_i$ is the actual RNN output; and,
$\hat{y}_i$ is the expected output from the dataset.

In a preferred embodiment, RNN 302 applies backpropagation through time ("BPTT") as an optimization algorithm to minimize the error of the model to maximize the likelihood of the data throughout updating all the weight matrices within the model. BPTT begins by unfolding a recurrent neural network in time. Then, gradients must be obtained. To achieve that, the overall loss L is computed as the sum of all the loss functions at times t=1 to t=T as follows:

$$L = \sum_{t=1}^{T} L^{(t)}$$

Loss at time 1:t is dependent on the hidden units at all previous timestamps 1:t, thus, the gradient is computed as follows:

$$\frac{\partial L^{(t)}}{\partial W_{hh}} = \frac{\partial L^{(t)}}{\partial y^{(t)}} \times \frac{\partial y^{(t)}}{\partial h^{(t)}} \times \left(\sum_{k=1}^{t} \frac{\partial y^{(t)}}{\partial h^{(k)}} \times \frac{\partial h^{(k)}}{\partial W_{hh}}\right)$$

Where:
$L^{(t)}$ is the overall loss at time t;
$W_{hh}$ is the weight matrix associated with the recurrent edge;
$y^{(t)}$ RNN output at time t; and,
$h^{(t)}$ hidden layer with inputs from t time step.

The partial derivative of the hidden layer with inputs at time t with respect to the hidden layer with inputs at time k is the multiplication of adjacent time steps:

$$\frac{\partial h^{(t)}}{\partial h^{(k)}} = \prod_{i=k+1}^{t} \frac{\partial h^{(i)}}{\partial h^{(i-1)}}$$

When using long sequences of input data during training in tandem with backpropagation and gradient-based learning methods, each of the neural network weights receives an update proportional to the gradient of the loss function involving current weight for each interaction of training. However, if the gradient becomes vanishingly small, the associated weight is blocked from changing its value which results in blockage of further training. To compensate for a vanishing gradient, one preferred embodiment employs long short-term memory cells, as will be further described.

Those skilled in the art will recognize that other arrangements, numbers, layers of neurons and activation functions are possible, and may provide the desired predictive features of the invention.

Referring to FIG. 3C, a preferred embodiment of LSTM memory cell 379, will be described. Within each memory cell there is recurrent edge 3102, and units of computation. The value associated with the recurrent edge is called cell state. The cell state flows along path 3103 through the cell, and may be changed by units of computation. The units of computation are called gates and may have diverse activation functions.

LSTM memory cell 379, in a preferred embodiment, comprises four separate and distinct neural network layers which function as the units of computation. Each neural network layer serves as a gate for various types of vector information as it moves through the memory cell. The vector information takes the following form:
- $x_t \in R^d$: input vector to the LSTM unit;
- $f_t \in R^h$: forget gate's activation vector;
- $i_t \in R^h$: input/update gate's activation vector;
- $o_t \in R^h$: output gate's activation vector;
- $h_t \in R^h$: hidden state vector also know as output vector of the LSTM unit;
- $\tilde{c}_t \in R^h$: cell input activation vector;
- $c_t \in R^h$: cell state vector;
- $W \in R^{h \times d}$, $U \in R^{h \times h}$ and $b \in R^h$: weight matrices and bias vector parameters which need to be learned during training;
- where the superscripts of d and h refer to the number of input features and number of hidden units, respectively Forget gate 3104 is responsible for deciding which information is allowed to pass and which information is blocked. Forget gate 3104 includes neural network layer 3104a, employing the Sigmoid function, and pointwise multiplication operation 3104b. Forget gate 3104 takes as its input hidden state vector $h_{(t-1)}$ and input vector $x_{(t)}$. Hidden state vector $h_{(t-1)}$ is concatenated with input vector $x_{(t)}$ at neural network layer 3104a. Forget gate 3104 produces forget gate activation vector, $f_t$, according to the following equation:

$$f_t = \sigma(W_{xf} x_{(t)} + W_{hf} h_{(t-1)} + b_f)$$

Where:
σ is the sigmoid activation function, which can be computed as:

$$\sigma(x) = \frac{1}{1+e^{-x}}$$

$W_{xf}$ is the weight matrix between cell input and forget gate;
$x_{(t)}$ is the input vector of the memory cell at step time t;
$W_{hf}$ is the weight matrix between the hidden layer and forget gate;
$h_{(t-1)}$ indicates the hidden units at time t; and,
$b_f$ is the bias term for the forget gate.

Forget gate activation vector $f_t$ is combined with cell state vector $C_{(t-1)}$ at pointwise up pointwise multiplication operation 3104b, which can affect the cell state.

The output of neural network layer 3104a and pointwise multiplication operation 3104b is a number between zero and one for each number in cell state $C_{(t-1)}$. Intuitively "1" represents "pass" while "0" represents "block".

Input gate 3106 is comprised of input gate layer 3106a, vector candidate layer 3106b, pointwise multiplication operation 3106c and pointwise addition operation 3106d.

Input gate layer 3106a takes as input the concatenation of input vector input vector $x^{(t)}$ and hidden state vector $h^{(t-1)}$ and outputs input/update gate activation vector $i_t$ according to the following equation.

$$i_t = \sigma(W_{xi} x^{(t)} + W_{hi} h^{(t-1)} + b_i)$$

Where:
σ is the sigmoid activation function, as previously described;
$W_{xi}$ is the weight matrix between cell input and input gate;
$x^{(t)}$ is the input of the memory cell at step time t;
$W_{hi}$ is the weight matrix between hidden layer and input gate;
$h^{(t)}$ indicates the hidden state vector at time t; and,
$b_i$ is the bias term for the input gate.

Vector candidate layer 3106b takes as its input, input vector $x^{(t)}$ concatenated with hidden state vector $h^{(t-1)}$ to output new candidate vector $\tilde{C}_t$, according to the following equation.

$$\tilde{C}_t = \tan h(W_{xg} x^{(t)} + W_{hg} h^{(t-1)} + b_g)$$

Where:
tan h is the tangent hyperbolic activation function;
$W_{xg}$ is the weight matrix between cell input and input node;
$W_{hg}$ is the weight matrix between the hidden layer and input node;
$h_{(t)}$ indicates the hidden state vector at time t; and,
$b_g$ bias term for the input node.

Cell state $C^{(t)}$ is updated by pointwise addition operation 3106d, according to the following equation.

$$C^{(t)} = (C^{(t-1)} \odot f_t) \oplus (i_t \odot \tilde{C}_t)$$

Where:
$f_t$ is the output of the forget gate;
$i_t$ input/update gate activation vector; and,
$\tilde{C}_t$ is the vector of new candidate values.

Output gate 3108 includes output gate layer 3108a, pointwise multiplication operation 3108b, and hyperbolic tangent pointwise operation 3108c. The output gate is in charge of deciding how to update the values of hidden units.

The input to output gate layer 3108a is the concatenation of input vector $x_{(t)}$, and hidden state vector $h_{(t-1)}$. The output of output gate layer 3108a is output gate activation vector, $o_{(t)}$ calculated as follows:

$$o_t = \sigma(W_{xo} x_{(t)} + W_{ho} h_{(t-1)} b_o)$$

Where:
σ is the sigmoid function, as previously described;
$W_{xo}$ is the weight matrix between cell input and output gate;
$W_{ho}$ is the weight between the hidden layer and output gate; and,
$b_g$ bias term for the output gate.

Cell state vector $C_{(t)}$ is copied at data copy point 3109 and passed to pointwise application of the hyperbolic tangent pointwise operation 3108c, to reduce the vector to a value between minus one and one. The result is passed to pointwise multiplication operation 3108b, along with output gate activation vector $o_t$ to derive the current state of the hidden state vector $h_{(t)}$.

Hidden state vector $h_t$ at the current time step can be computed as follows:

$$h_t = o_t \odot \tan h(C_t)$$

Where:
$o_y$ is the output gate activation vector; and,
$C_t$ is the cell state at the current time step.

Hidden state vector $h_t$ is copied at data copy point 3110 and passed to the next layer at signal 3112 and to input signal 3114 across timestamp indicator 3116, where it assumes the notation $h_{(t-1)}$ indicating a single step back in time.

Likewise, cell state vector $C_t$ is passed to input cell input 3118 as $C_{(t-1)}$ across timestamp indicator 3116.

Figure 4:
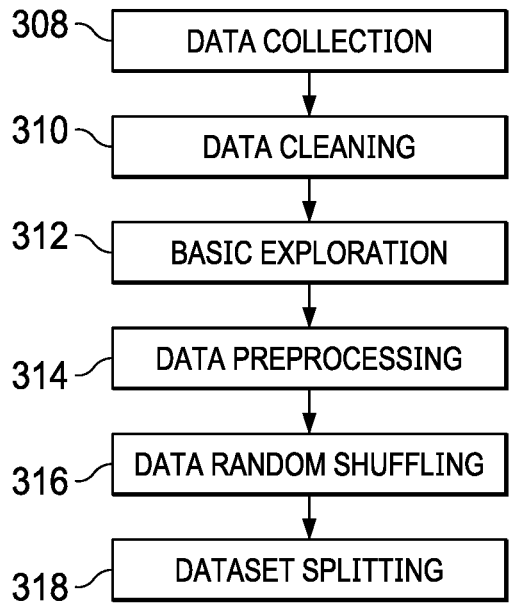
FIG. 4 is a flowchart of a method of gathering and preparing data of a preferred embodiment.

Referring to FIG. 4, a preferred method of collecting and preparing data for the RNN will be described. At step 308, data is collected. In this embodiment, three months worth of data points are gathered as examples.

At step 310, the data collected is cleaned to remove error value points and non-applicable data points such as clearly inaccurate data, informational repeated values, incorrect string or numerical data.

At step 312, the input for the model is chosen as a sequence of 10 data points, in this case:

$$[p(t), p(t-1), p(t-2), p(t-3), \ldots, p(t-n)]$$

Where:
$p(t-n)$ is the data point at n time steps in the past; and,
$n = \{x \in N: x \geq 0\}$.

At step 314, the data is preprocessed. Standardization is a feature scaling technique that is very beneficial to train the model when using gradient descent optimization techniques, such as in this method and system. Following equation is used to standardize the data:

$$p' = \frac{p - \mu}{\sigma}$$

Where:
p is the original data value;
p' corresponds to the standardized data value;
$\mu$ is the mean of the feature vector; and,
$\sigma$ is the standard deviation.

The output of the RNN model will be the standardized next data value, to de-standardize it the following equation is used:

$$p = p'\sigma + \mu$$

At step 316, the data is shuffled into a random order. The data points need to be randomly shuffled so that the model does not become biased towards the same data points before them.

At step 318, three datasets are created containing the following percentages of the total cleaned data.
Train—70%. Data for building the model.
Validation—20%. Data for testing and tuning the model.
Test—10%. Gather performance metrics using data that the model has never seen to properly verify its capability to generalize a time dependent data function.

Figure 5:
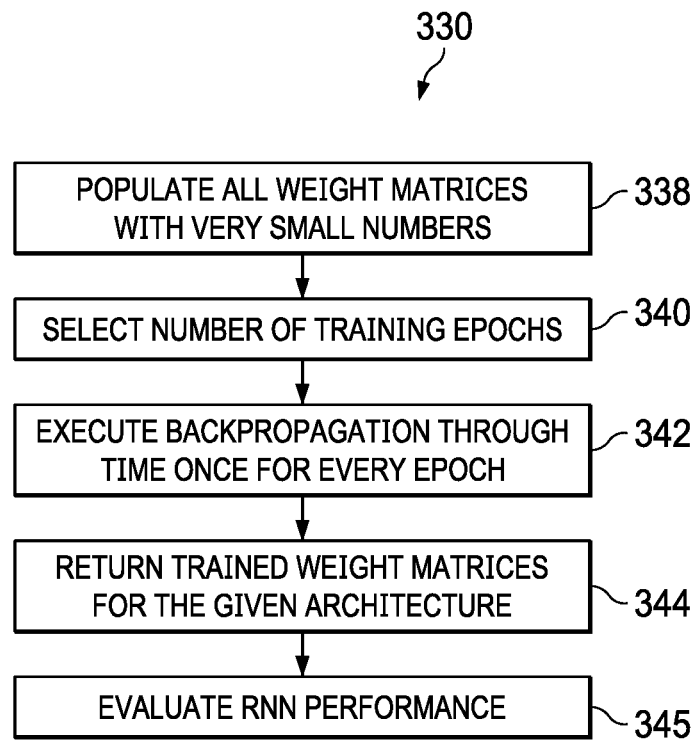
FIG. 5 is a flowchart of a method of training and evaluating an RNN of a preferred embodiment.

Referring to FIG. 5, method 330 to train the RNN will be described. Before use, the RNN must be trained to adjust the weights contained within the matrices of each network layer. At step 338, all the weight matrices are populated with a very small number that satisfies the following condition:

$$0 < x \leq 0.01$$

At step 340, the number of training epochs is chosen. At step 342, the predetermined number of epochs is executed by the untrained neural network using backpropagation with the preprepared data sets. In a preferred embodiment, the preset number of epochs is anywhere from 30 to 1,000. Other iteration counts can be used. At step 344, the result of the training profiles is returned as a number of weight matrices for the given architecture that are used to predict the data point for a next time step.

At step 345, performance of the RNN is evaluated using the $R^2$ score which can be calculated as follows:

$$R^2 = 1 - \frac{SSE}{SST}$$

Where:
SSE is sum of squared errors, as follows:

$$SSE = \sum_{i=1}^{n}(y^{(i)} - \hat{y}^{(i)})^2$$

Where:
$y^{(i)}$ is the actual RNN output
$\hat{y}^{(i)}$ is the expected output from the dataset
SST is the total sum of squares:

$$SST = \sum_{i=1}^{n}(y^{(i)} - \mu_y)^2$$

Where:
$y^{(i)}$ is the actual RNN output
$\mu_y$ is the mean of the outputs

Once method 330 is complete, the neural network is "trained" and it is able to recognize an unknown pattern and produce a result. In this case, the result is a predicted future data value for a set of historical data points. In this embodiment, the resulting data value prediction is used to calculate when an internet search crawl should be performed, next time to crawl.

Figure 6:
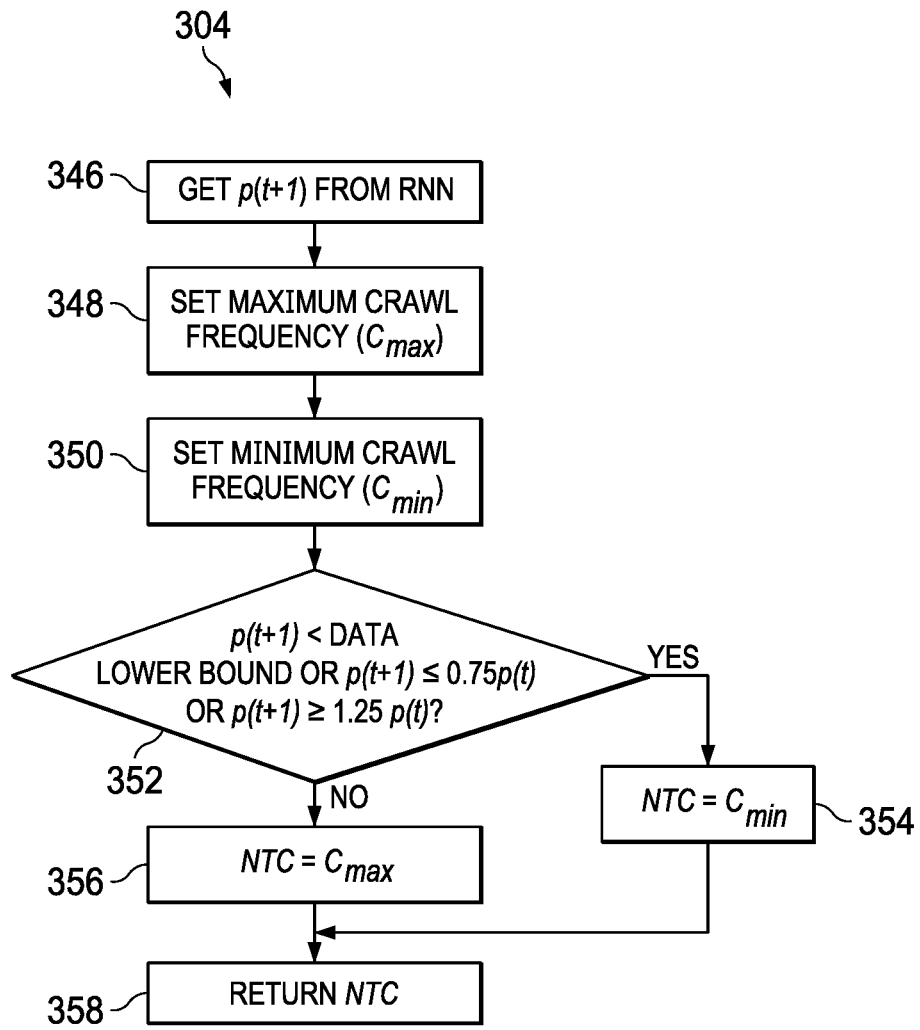
FIG. 6 is a flowchart of a method executed by a processing logic component of a preferred embodiment.

Referring to FIG. 6, the method of employing the data value prediction generated by the RNN as input for processing logic component 304, to determine the next time to crawl $t_{i+1}$, will be described.

At step 346, the predicted data value, $p(t+1)$ is retrieved from the RNN.

At step 348, maximum crawl time $C_{max}$ between crawls is set. At step 350, minimum crawl time $C_{min}$ between crawls is set.

At step 352, next time to crawl, NTC, can be obtained using the equation:

$$NTC = \begin{cases} C_{min} & p(t+1) < DLB \\ C_{min} & p(t+1) \leq 0.75 p(t) \\ C_{min} & 1.25 p(t) \leq p(t+1) \\ C_{max} & \text{otherwise} \end{cases}$$

Where:
$C_{min}$ represents the minimum amount of waiting time allowed between crawls;
$C_{max}$ is the maximum amount of waiting time between crawls; and, DLB is the data lower bound.

If p(t+1) is below DLB, then the next crawl $t_{i+1}$ should happen as soon as possible, dictated by the $C_{min}$ parameter.

If the predicted data value presents a variation of +25% or −25% with respect to the current data, the data is interpreted to have changed considerably and attention must be paid, then the next crawl, $t_{i+1}$, should happen as soon as possible, dictated by the $C_{min}$ system parameter.

If any of the conditions is true, then the method moves to step 354. If not, that is, if all the conditions are false, then the method moves to step 356.

At step 354, NTC is set to $C_{min}$ and the method moves to step 358.

At step 356, if there is no substantial data change, then, NTC is set to $C_{max}$, and a wait will occur for the maximum time allowed the next crawl is performed, as dictated by the $C_{max}$ parameter.

At step 358, the algorithm returns NTC, the next time to crawl.

Referring then to FIGS. 7A through 7N, an exemplary excerpt of code for a recurrent neural network for a preferred embodiment is described.

At lines 1-14, the libraries used to obtain data, preprocess the data, train, visualize, use and test the neural network are imported. At line 16, the DataLoader class is created. The DataLoader class is used to load pricing data into the LSTM model.

At line 23, a comma-separated value (csv) file is imported into a data frame. At line 26, all of the data from the csv file is scaled to fit within a specified range. In this instance, the range is from 0 to 1.

At line 29, a self.prepare data frame is defined because the database may have information gaps for certain days for some products. At lines 32-35 attributes of the class are defined for the data, such as product id, window size, training days, and test days. At line 38, a function is defined to fill any blank days in the self prepare data frame using data from the previous day.

At lines 50-52, the minimum price list, data lower bound price list, and dates list are initialized. At lines 54-77, the lists are defined and the data for each row is verified. At line 59, the current date is added to the dates list.

At line 61, the system queries whether or not the minimum price is a number. If the minimum price is a number, then, at line 64, the system queries whether or not this is the first row in the list. If the minimum price is not a number, then at lines 65-66, the normalized minimum price is set to "none" and the method exits. At lines 71-72, the last row from the minimum price list and data lower bound price list are added to the ends of the lists min_price_list and map_price_list, respectively. If minimum price is indeed a number, then at lines 73-77, the minimum price is added to the list, and the current data lower bound is used.

At lines 80-86, the minimum price list is converted to an array, a "self" class attribute is defined for the minimum price array, and then normalized to fall between 0 and 1. At lines 89-91, "self" class attributes for normalized minimum price, data lower bound price, and dates, are set up with the lists created.

At lines 93-94, a function is defined to call the scaler to transform an array so that all the values fall in the 0-1 range. Because different time periods of data may have different value ranges the array must me normalized to an acceptable LSTM scale. A normalized array is returned. At line 110-111, a function is defined to call the scaler to convert a normalized array back to the original values.

At line 125, a function is defined to generate information for the current window. The number of windows is determined based on the number of test days. At lines 136-144, the information is generated for all of the windows, and the input/output training data is retrieved.

At lines 147-151, input/output data to be tested in the trained network is retrieved. At lines 154-163, the last price, last date, next date, and current data lower bound are retrieved for the current window.

At line 165, a function is defined that creates an input and an output array from the information in the unprocessed array. The unprocessed array has the minimum price information for the last 90 days and the function will setup an array with the window and format needed for the LSTM. For instance, the window size considered is two (2) so from a list of [0, 1, 2, 3, 4, 5, 6, 7, 8, 9] the function will return the following:

| input,  | output |
|---------|--------|
| [0, 1], | [2]    |
| [1, 2], | [3]    |
| [2, 3], | [4]    |
| [3, 4], | [5]    |
| [4, 5], | [6]    |
| [5, 6], | [7]    |
| [6, 7], | [8]    |
| [7, 8], | [9]    |

At line 194, the defined window size is retrieved. At lines 196-197, the input and output arrays are initialized. At lines 199-209, for each possible window, the input information and corresponding output information are retrieved, and an "x" is added to the input array and a "y" is added to the output array.

At lines 214-215, the dynamic crawling parameters for $C_{min}$ and $C_{max}$ are defined. In this example, the maximum time between crawls is set as one (1) day and the minimum time is set as 2 hours, but the unit used is seconds. At lines 216-217, the alpha variable and threshold risk are instantiated. At line 220, the LSTM model is defined as a Keras Sequential object.

At line 221, a function is defined that builds a stacked LSTM model. In this example three hidden layers are stacked with a sliding window of 10 days for the minimum price.

At lines 242-244, the first hidden layer is defined with 20 hidden units in a 10×1 shape. The argument "return_sequences=True" is important because it ensures that the LSTM cell returns all of the outputs from the unrolled LSTM cell. Otherwise the output will only be from the last time step. At lines 246-250, the second layer is defined with 20 hidden units, and third output layer is defined with an activation function. In this example the LeakyReLU activation function is used but other activation functions may be used, such as Sigmoid, ReLU, or Tan h.

At lines 255-257, the model is compiled using an "adam" optimizer and a "mean squared error" loss function.

At line 259, the train method is defined to train the LSTM model for a fixed number of data iterations, or epochs. At lines 281-282, the predictions method is defined to output an array of predictions based on the input samples.

At line 292, a method is defined to compute the next time to crawl.

At line 309, a function is defined to calculate the mean square error between the correct price information in the test array and the corresponding prediction generated by the LSTM model. In this embodiment, it measures the average of the squares of the errors.

At lines 322-323, a function is defined to create a plot diagram which displays the predictions and training data pulled from the corresponding lists of prediction and real data.

At line 372, a function id defined to retrieve the previous minimum prices for a set number of days. At lines 386-412, the function retrieves the fields id, did, date of consult, date, ar (amazon), data lower bound, product id, merchant id, minimum price, average price, number of violations, and id count for the set number of days. The function creates a data frame and saves it as a comma separated value file for later use.

At lines 415-417, the minimum prices are retrieved from the PTN table, and organized in a data frame with a year/month/day format. If information is retrieved for the data frame, then a corresponding csv file is created.

At lines 426-431, a function is defined to create.csv files for identified products using the store id, number of days and product ids to be processed. A csv is created for each product in the list of identified products. This is important because a query to the PTN table is computationally expensive, so storing local LSTM dataset files allows the system to easily retrieve the .csv files for a variable f of products.

At lines 451-463, the parameters for training the LSTM neural network are defined. The epochs are the number of iterations of training performed. The batch size is the number of batches for each epoch. The test days are the number of "future" predictions made. The train days are the number of previous training days used to train the LSTM long term memory. The window size is the number of last days used for short term memory.

At lines 471-499, for each .csv file for the variable f of products the product id is retrieved, and lists are created for the predictions, targets, next crawl, and score.

At line 503, the system validates that the data did not have a blank first row. If the first row is not blank, then at line 506, the system, for each of the defined test days, calls the functions to train, test, and print the results.

At lines 509-512, the class needed to instantiate the LSTM model is called and the model is built. At line 517, the data is organized in the format needed for the LSTM network and the data is configured for the current window.

At lines 521-522, the LSTM model is trained. At lines 526-530, the train and test output predictions are retrieved. At lines 534-538, the train and test outputs are unnormalized to get a corresponding real number for the predicted prices.

At lines 554-5589, the mean squared error between the training prices and the predictions is calculated and the training score is printed. At lines 564-568, the mean squared error between the testing prices and corresponding predictions and the testing score is printed.

At lines 572-579, the current prediction, correct price, and training score are added to their corresponding lists. At lines 583-589, a dictionary is created for the compute next time to crawl function.

At lines 594-600, the next time to crawl is computed in seconds and converted to hours. At lines 603-605, the prediction data is plotted and printed for each product. At lines 609-613, a .csv file is created and tests are run for the csv files.

Figure 8:
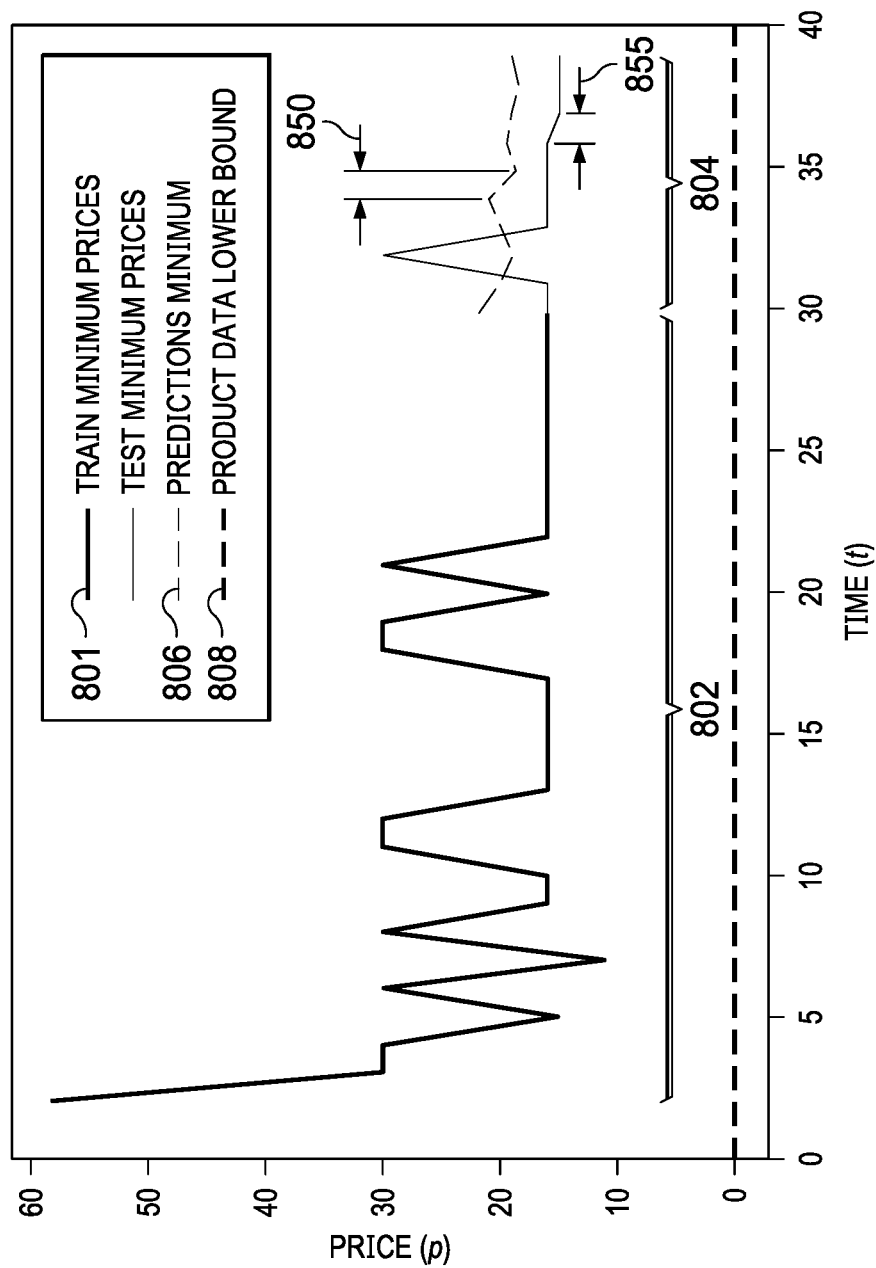
FIG. 8 is a graphical representation of a method of training and evaluating a recurrent neural network of a preferred embodiment.

Referring then to FIG. 8, a graphical representation of an exemplary neural network training and prediction is described.

Line 808 represents the product data lower bound input into the system. Curve 801 represents the data value, p, for type, i, over time, t. Segment 802 of curve 801 represents the data used to train the neural network from times, t=0 to t=29. Curve 806 represents the data value predictions returned from the neural network after training. Segment 804 of curve 801 represents the actual data values for times t=30 to t=40. The graph shows the surprising and useful result that the neural network correctly predicts data value drop 855 from price prediction line segment 850. Data drop prediction is especially useful when monitoring for violations of the data lower bound because harvesting and storage of redundant data can be avoided, thereby drastically conserving computational cost and memory space.

Figure 9:
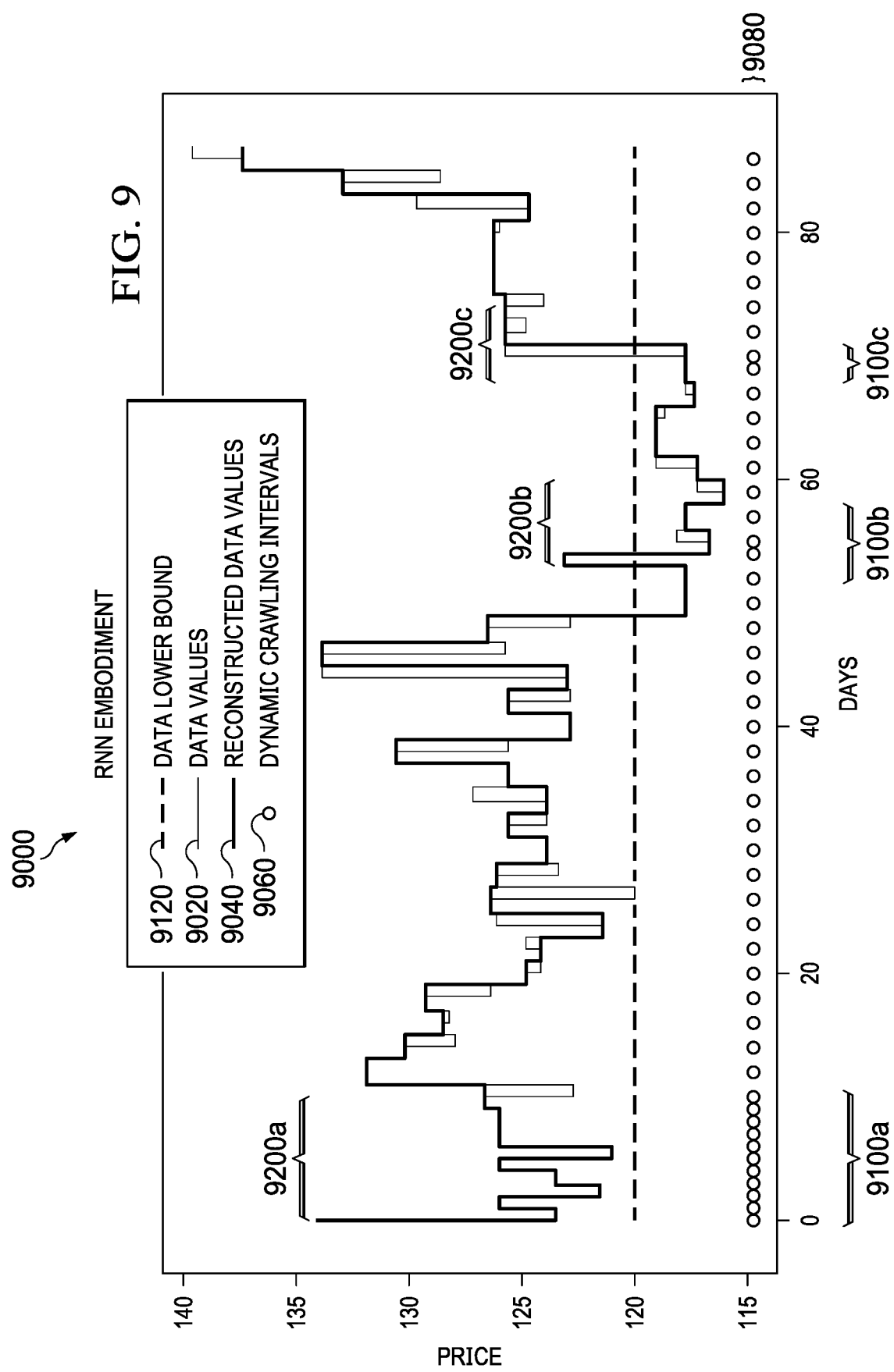
FIG. 9 is graph of actual data, reconstructed data and crawl frequency of a recurrent neural network of a preferred embodiment.

Referring then to FIG. 9 the RNN embodiment will be further described.

Plot 9000 shows data values 9020, reconstructed data values 9040, and dynamic crawling intervals 9060, shown at line 9080. Data values 9020 shows a reasonably close correlation with reconstructed data values 9040 thereby indicating a high likelihood that important data changes have been recorded. Dynamic crawling intervals 9100*a* shows increased frequency at the outset of data capture 9200*a*. Likewise, the RNN embodiment shows an increased dynamic crawling intervals 9100*b* and 9100*c* as the data values fall below data lower bound 9120, at 9200*b* and 9200*c*, respectively.

FIG. 10A is a bar chart of a comparison of the various embodiments, each compared to a high-frequency crawling application such as octo parse available from Octoparse.com or Cyotek Web Copy, available from cyotek.com, as known in the prior art. Bar chart 1000 shows an accuracy for capturing data lower bound violations and a percentage of fewer crawls performed, for each embodiment described.

At comparison 1006, the RNN embodiment shows a 56% accuracy percentage 1006*a*, for capturing data lower bound violations while demonstrating 22% fewer crawls, 1006*b*, than the prior art.

At comparison 1008, the rate of change embodiment demonstrates an accuracy for capturing data lower bound violations of 62% 1008*a*, while decreasing the number of crawls performed 23%, 1008*b*, over the prior art.

Likewise, the rate of change and displacement embodiment, shown at comparison 1010, demonstrates a 61% accuracy for capturing data lower bound violation 1010*a*, while demonstrating a 25% reduction in the number of crawls performed, 1010*b*, over the prior art. The PID embodiment comparison, shown at 1012, demonstrates an accuracy for capturing data lower bound violations of 97%, 1012*a*, and a reduction of the number of crawls performed by 32%, 1012*b*, over the prior art. In each case, the disclosed embodiments show a drastic improvement in the accuracy of capturing data lower bound violations and in the percentage of unnecessary crawls avoided.

Figure 10B:
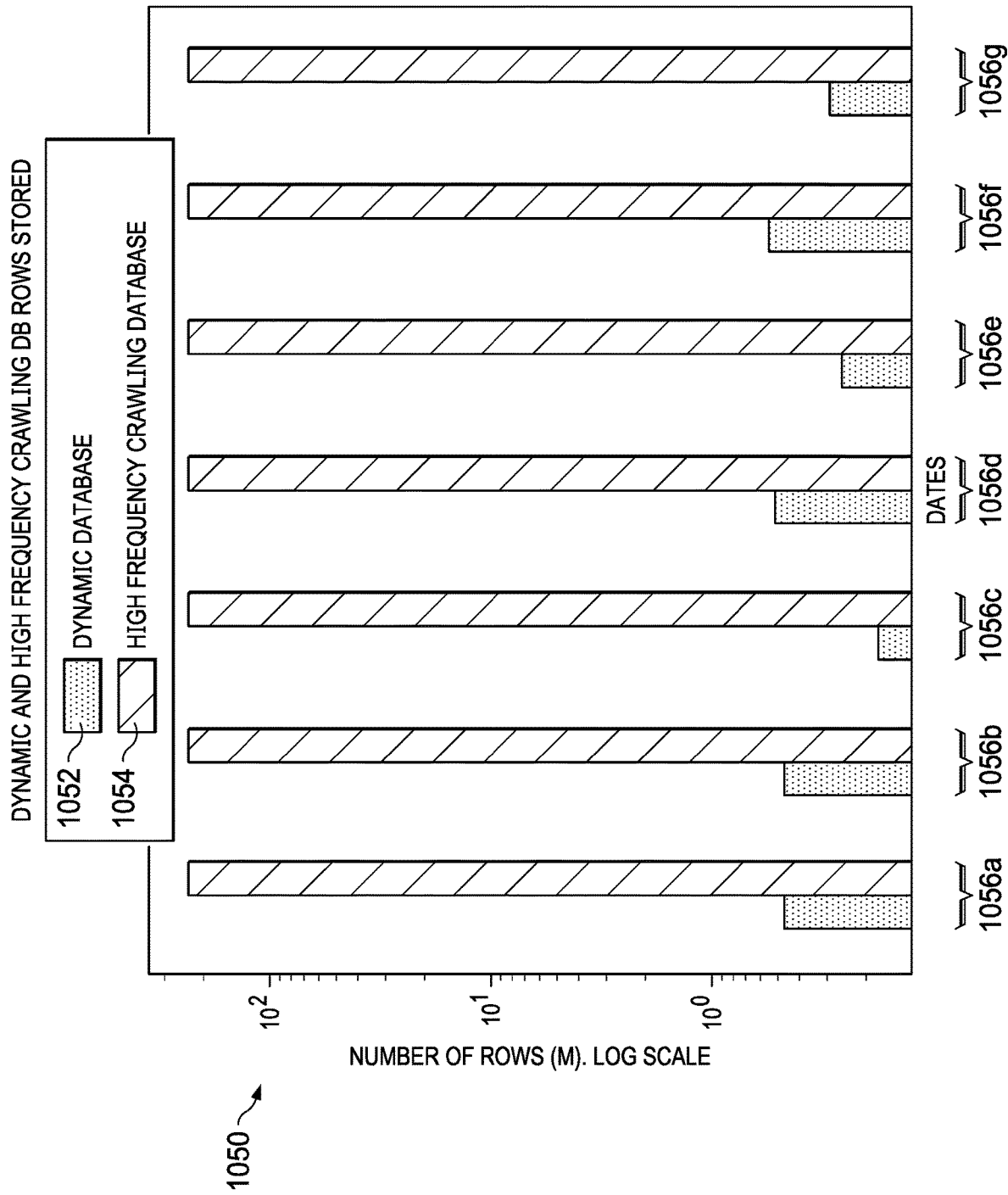
FIG. 10B is a bar chart of a comparison of the PID embodiment to the prior art.

Referring then to FIG. 10B, a further comparison of the PID embodiment to the prior art will be described. Bar chart 1050 shows a comparison of the number of rows of data stored by an implementation of the PID embodiment versus an implementation of a high frequency crawler of the prior art. The number of rows stored by the PID embodiment is shown at columns 1052. The number of database rows stored by the prior art system is shown at columns 1054. Data was taken at dates, 1056*a*, 1056*b*, 1056*c*, 1056*d*, 1056*e*, 1056*f*, and 1056*g*. In each case, the prior art the number of rows stored at 1054 averages between 270 and 285 million rows per day. The PID embodiment shows a drastic reduction in the number of rows stored to an average of 1 to 4 million rows stored for each day of the comparison, resulting in surprising data storage improvement over time.

Referring to FIG. 10C, bar chart 1100 of the number of crawls required per day to capture a set number of data lower bound violations for PID embodiment and the number of crawls required by a prior art system to capture the same number of data lower bound violations is shown. The PID embodiment is shown at columns 1102. The prior art example is shown at columns 1104. In each of seven days, 1106a, 1106b, 1106c, 1106d, 1106e, 1106f and 1106g the prior art crawler required an average of about 375,000 crawls per day. By comparison, the PID embodiment showed that the number of crawls required are about 140,000 crawls per day. In each case, a surprising reduction in the number of crawls required per day was achieved by the PID embodiment over the prior art system.

Referring to FIG. 10D, plot 1150 shows a comparison of the percentage of data lower bound violations recognized by the prior art system and the PID embodiment. The prior art curve is shown at plot 1152, the PID embodiment curve is shown at plot 1156 and accuracy data points for each plot are represented as points 1154. In this example, the comparison was made all over a seven day period 1153a, 1153b, 1153c, 1153d, 1153e, 1153f and 1153g. The plots show that the accuracy of the PID embodiment nears or surpasses that of the prior art on each of the days tested. This is a surprising result considering the vast improvement in the number of rows stored in the database by the PID embodiment.

It will be appreciated by those skilled in the art that the described embodiments disclose significantly more than an abstract idea including technical advancements in the field of data processing and autonomous internet crawlers.

It is also appreciated by those skilled in the art that modifications can be made to the embodiments disclosed and remain within the inventive concept, such as by omitting various described features, rearranging features, and using features from one embodiment in another embodiment. Therefore, this invention is not limited to the specific embodiments disclosed, but is intended to cover changes within the scope and spirit of the claims.

The invention claimed is:

1. A system for reducing memory consumption and increasing bandwidth usage efficiency comprising:
   a web crawler server, having a first memory, operatively connected to a network;
   a database server, having a second memory, operatively connected to the network;
   a dynamic crawl rate server, having a third memory, operatively connected to the network; and
   a set of instructions, resident in the first memory, the second memory and the third memory, that when executed cause the system to:
      instantiate an artificial neural network (ANN) having:
         an ANN input layer;
         an ANN hidden layer set, operatively connected to the ANN input layer;
         an ANN dense hidden layer, operatively connected to the ANN hidden layer set; and
         an ANN output layer, operatively connected to the ANN dense hidden layer;
      receive a minimum crawl frequency value;
      receive a maximum crawl frequency value;
      receive a data lower bound value;
      receive a current data point;
      introducing the current data point into the ANN input layer;
      activating the ANN hidden layer set and the ANN dense hidden layer to generate a future data point related to the current data point;
      if the future data point is less than the data lower bound value; or, the future data point is less than or equal to about 75% of the current data point; or, if the future data point is greater than or equal to about 125% of the current data point; then, set a next time to crawl variable to the minimum crawl frequency value;
      if the future data point is greater than or equal to the data lower bound value; and, if the future data point is greater than about 75% of the current data point; and, if the future data point is less than about 125% of the current data point; then, set the next time to crawl variable to the maximum crawl frequency value;
      wait until a time to next crawl occurs based on the next time to crawl variable;
      request a set of webpages, related to the current data point and the next time to crawl variable;
      receive the set of webpages; and,
      store the set of webpages.

2. The system of claim 1 wherein the set of instructions further comprises training the ANN by:
   receiving a set of programming data sequences, including at least a current training data point and a set of past training data points;
   populating the ANN hidden layer set and the ANN dense hidden layer with a set of random weight values;
   executing back propagation through time for each set of programming data sequences; and,
   returning a set of trained weight matrices for the ANN hidden layer set and the ANN dense hidden layer, thereby providing a trained ANN.

3. The system of claim 2 wherein the set of instructions further comprises:
   deriving a performance measure from the trained ANN.

4. The system of claim 2 wherein the set of programming data sequences is standardized.

5. The system of claim 1 wherein the ANN hidden layer set is further comprised of a plurality of LSTM cells.

6. The system of claim 1 wherein the ANN hidden layer set further comprises:
   a first LSTM hidden layer operatively connected to a second LSTM hidden layer through a set of synapses.

* * * * *